(12) United States Patent
Siu

(10) Patent No.: US 7,967,431 B2
(45) Date of Patent: *Jun. 28, 2011

(54) SPECTACLES

(76) Inventor: Yu Siu, Shatin New Territories (HK)

( * ) Notice: Subject to any disclaimer, the term of this patent is extended or adjusted under 35 U.S.C. 154(b) by 0 days.

This patent is subject to a terminal disclaimer.

(21) Appl. No.: 12/384,411

(22) Filed: Apr. 3, 2009

(65) Prior Publication Data

US 2010/0073627 A1 Mar. 25, 2010

Related U.S. Application Data

(60) Provisional application No. 61/194,096, filed on Sep. 23, 2008.

(51) Int. Cl.
*G02C 1/02* (2006.01)
(52) U.S. Cl. ...................................... 351/110
(58) Field of Classification Search .................. 351/110, 351/124, 41, 158
See application file for complete search history.

(56) References Cited

U.S. PATENT DOCUMENTS

| | | | | |
|---|---|---|---|---|
| 5,847,800 A | * | 12/1998 | Tachibana | 351/110 |
| 6,540,350 B2 | * | 4/2003 | Fujita | 351/110 |
| 7,086,733 B1 | * | 8/2006 | Bac | 351/110 |
| 7,658,492 B2 | * | 2/2010 | Siu | 351/110 |

* cited by examiner

*Primary Examiner* — Hung X Dang

(74) *Attorney, Agent, or Firm* — Raymond Y. Chan; David and Raymond Patent Firm

(57) ABSTRACT

A pair of rimless spectacles includes two lenses, a frame including two temple units and a bridge, and a connection mechanism. The connection mechanism includes a plurality of first connectors spacedly provided at the lenses at a predetermined location and a plurality of second connectors provided at a predetermined location of each of the temple units and the bridge respectively, wherein the second connectors are coupled with the first connectors respectively to couple the temple units at two outer sides of the lenses respectively and to couple the bridge between two inner sides of the lenses respectively in a tool-less manner.

3 Claims, 24 Drawing Sheets

SPECTACLES

CROSS REFERENCE OF RELATED APPLICATION

This is a non-provisional application of a provisional application having an application No. 61/194,096 and a filing date of Sep. 23, 2008.

BACKGROUND OF THE PRESENT INVENTION

1. Field of Invention

The present invention relates to spectacles, and more particularly to a rimless spectacles, wherein a plurality of coupling slots are located at the lenses to engage with the temples and the bridge, so as to allow the lenses to be quickly fastened on the temples and the bridge to form an entire body structure of the rimless spectacles.

2. Description of Related Arts

Corrective lens have been existed in human history for a long time. People have used corrective lens to modify the focal length of the eyes and the corrective lens have gradually evolved to wearable glasses. Wearable glasses have been more widely used in modern society. Conventional glasses comprise a lens unit mounted at a frame unit. The frame unit usually comprises a frame, two temples and a bridge. Traditionally, the frame, the temples and the bridge are made integrally to form the frame unit. In other words, the frame, the temples and the bridge are all connected altogether in conventional spectacles, wherein each temple is fastened by a screw to an outer side of the frame.

The main purpose for people to wear spectacles is to correct vision or protect the eyes. Also, since spectacles are usually placed on the faces of people, people have even higher demands on the aesthetic value of the spectacles. As illustrated above, the frame is an indispensable component of the spectacles and the frame is usually adapted to secure the lens unit. Also, the conventional frame of the spectacles is usually made of metal materials or other stiff materials. So, when people wear spectacles, existence of the spectacle frame usually change the person's appearance on the face which is also a shortcoming of conventional spectacles.

With development of the society, more and more varieties extend from the conventional spectacles, such as rimless spectacles. Structurally, the rimless spectacles comprise lenses, temples, and a bridge directly connecting two lenses, wherein more than one connection holes are on each lens, such that the temples and the bridge are connected at the connection holes respectively. Generally speaking, the lens is made by glass materials, especially for near-sighted and far-sighted spectacles. Furthermore, the thickness of the lens in the middle is different from that on the side. In other words, the surface of the lens of either near-sighted or farsighted spectacles is not a flat surface, and the difficulty of drilling holes thereon is thus increased. Normally, when drilling the holes on an object, the drilling device has to be perpendicular to the surface to be drilled to achieve the best drilling effect. In addition, the stiffness of glass materials is high and drilling holes thereon is likely to cause the glass material to break.

In addition, the tolerance of the hole must be considered. If the hole is too big, the lens will be unstable after the temples and the bridge are mounted thereto. If the hole is too small, the temples and the bridge cannot be affixed thereto. Or the lens will be cracked when the temples and the bridge are forced to affix to the lens.

With the difficulty in drilling holes on the lens mention above, it is inconvenient for customers to purchase rimless spectacles because when one chooses his or her own rimless spectacles, the lenses and the spectacle frame are separately chosen by the customer and put together by a technician. Because of the difficulty in drilling holes on an uneven lens surface, the technician usually takes longer time to put the lenses and the spectacle frame together. In other words, the customer has to wait for a long time from choosing the spectacles to actually receiving the final product.

Improved rimless spectacles are found in the market that the rimless spectacles do not require any hole predrilled on the lens. The lens has a notch pre-formed at the peripheral edge to fit a core-wire at the notch. Therefore, the temples and the bridge can be mounted to the lenses through the wires. However, such rimless spectacles can be made only in particular styles of lenses and the assembling operation is relatively complicated.

SUMMARY OF THE PRESENT INVENTION

A main object of the present invention is to provide rimless spectacles, wherein the rimless spectacles are manufactured by a unique method to provide a special connection way to connect the lenses and the spectacle frame.

Another object of the present invention is to provide rimless spectacles, wherein each of the lenses thereof comprises two first connectors corresponding to second connectors at the temple units and the bridge, such that the lenses can be fastened on the temple units and the bridge via the first and second connectors.

Another object of the present invention is to provide rimless spectacles, wherein it is not necessary to drill any hole on the lenses, so the difficulty in manufacturing is reduced and the manufacturing efficiency is thus increased.

Another object of the present invention is to provide rimless spectacles, wherein when a customer purchases the rimless spectacles, he or she can receive the final product quickly due to special manufacturing and connection design of rimless spectacles in the present invention.

In order to accomplish the goal of the present invention, the rimless spectacles comprise:

two lenses, each of which has a front side, a rear side, and a peripheral edge which is defined between laterals of the front and the rear sides;

a frame comprising two temple units and a bridge;

a connection unit comprising a plurality of first connectors provided at the peripheral edges of the lenses respectively and a plurality of second connectors, which are located at the two temple units and the bridge to detachably couple with the first connectors respectively, wherein the two temple units are coupled at two outer sides of the lenses respectively and the bridge is coupled at two inner sides of the lenses respectively, such that the frame is assembled with the lenses by detachably coupling the second connectors with the first connector to form the rimless spectacles.

These and other objectives, features, and advantages of the present invention will become apparent from the following detailed description, the accompanying drawings, and the appended claims.

DETAILED DESCRIPTION OF THE PREFERRED EMBODIMENT

Figure 1:
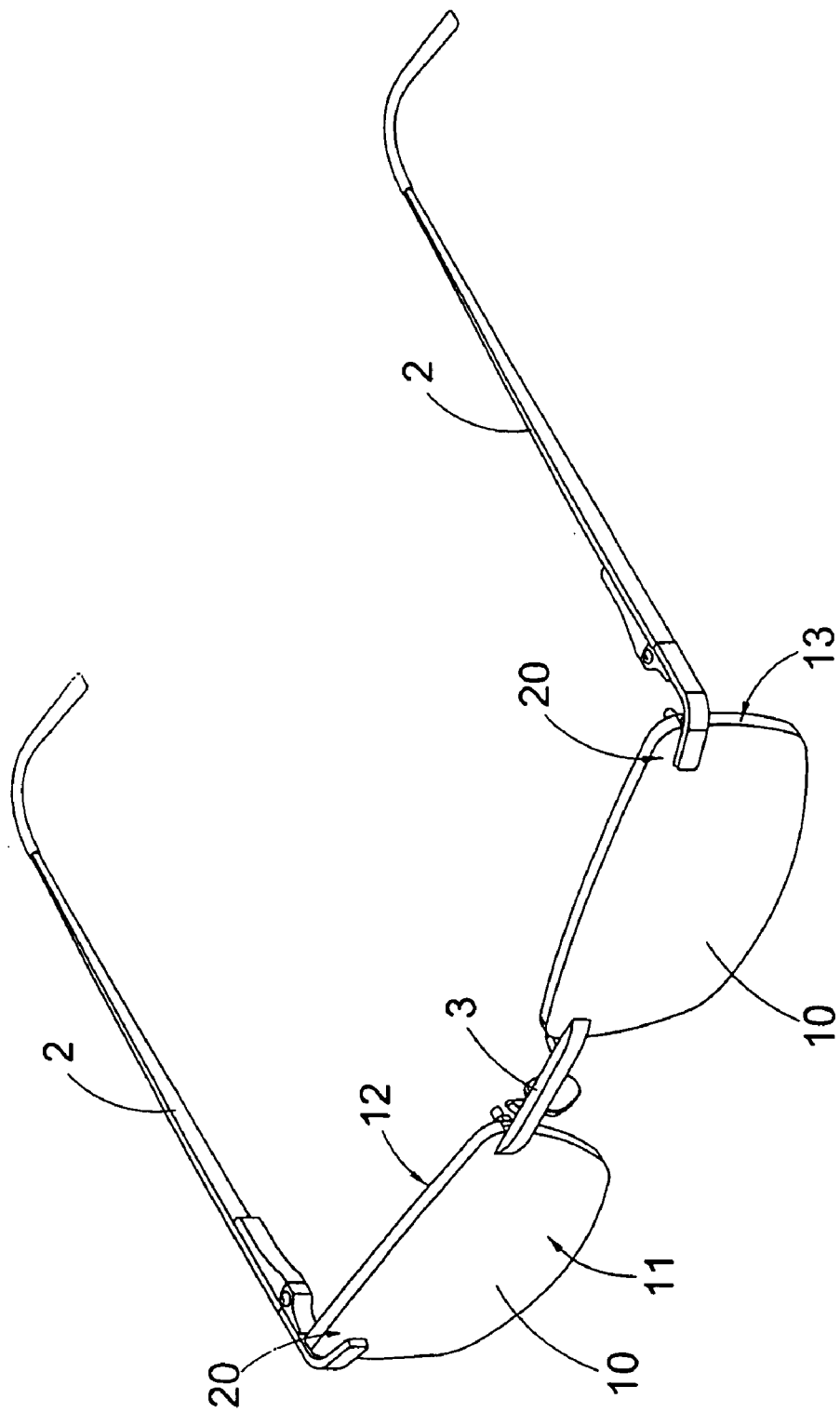
FIG. 1 is a perspective view of rimless spectacles according to a first embodiment of the present invention.
Figure 2:
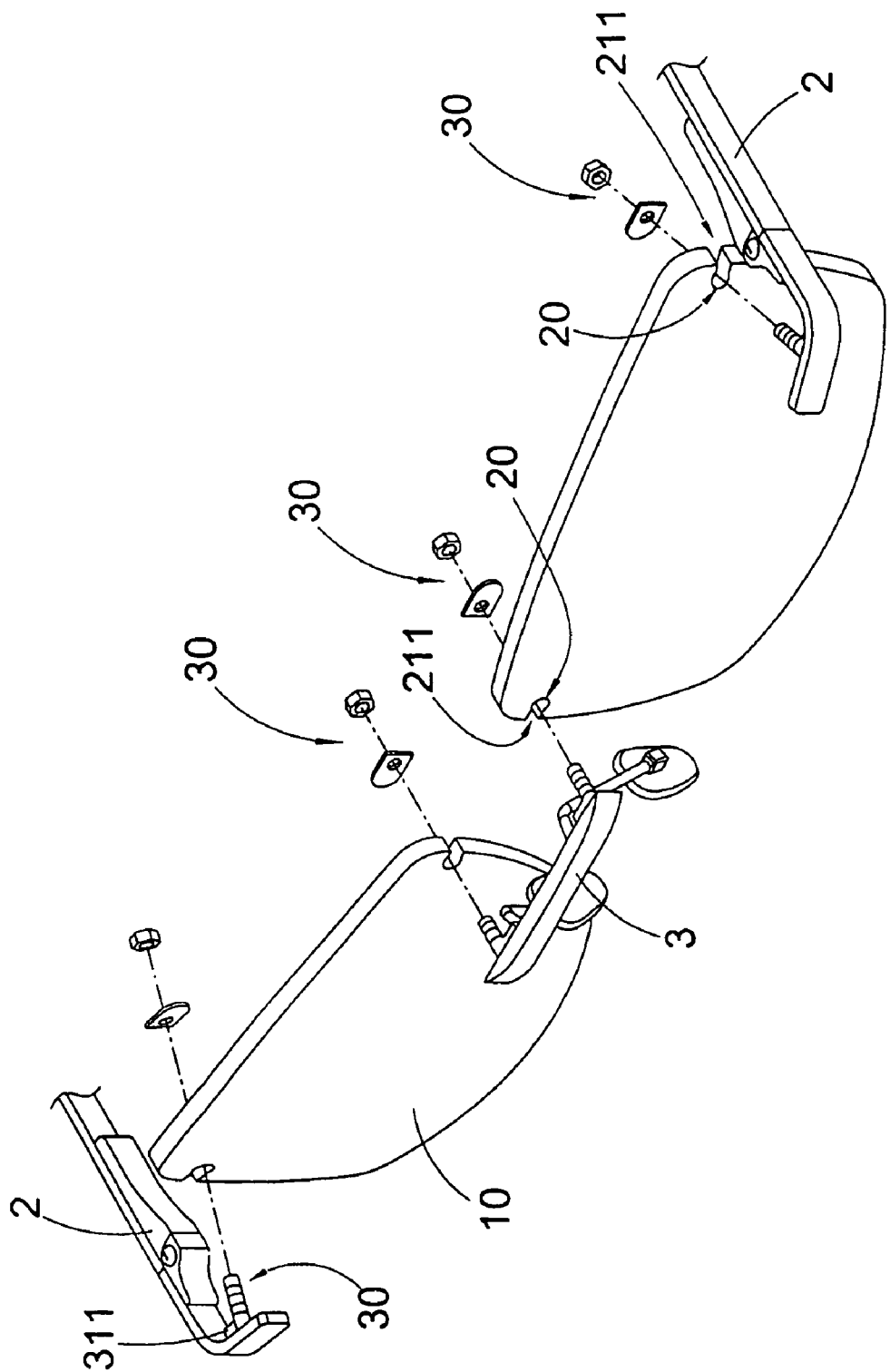
FIG. 2 is an exploded perspective view of the rimless spectacles according to the first embodiment of the present invention.
Figure 3:
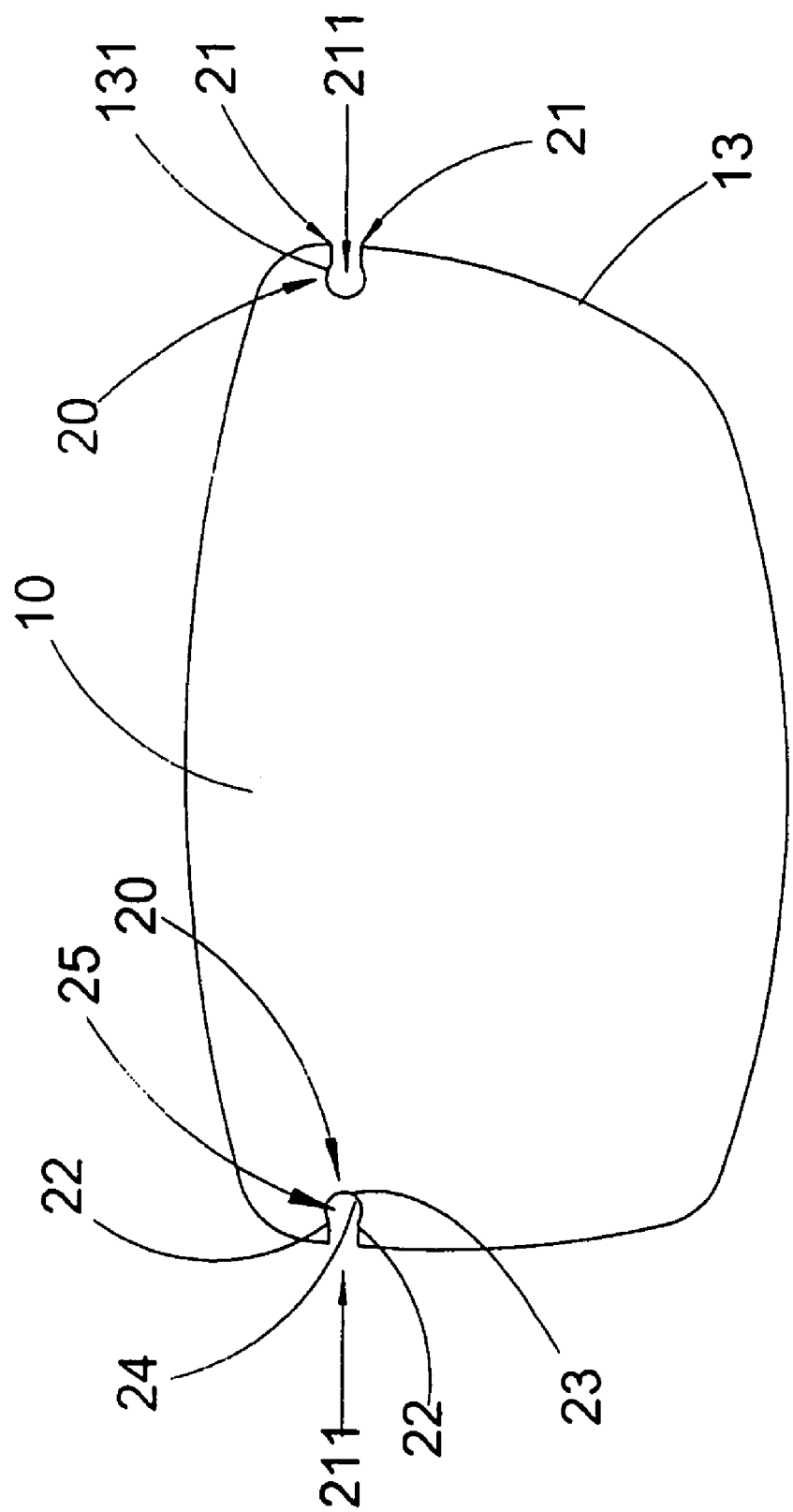
FIG. 3 is a schematic view of a lens of the rimless spectacles according to the first embodiment of the present invention.

Referring to FIG. 1 to FIG. 3 of the drawings, a rimless spectacles according to preferred embodiment of the present invention is illustrated, wherein the rimless spectacles comprises two lenses 10. Each of the lenses 10 has a front side 11, a back side 12, and a peripheral edge 13 located between the laterals of front and the rear sides 11, 12. A plurality of first connectors 20 of the connection mechanism are spacedly provided at the peripheral edges 13 of the lenses 10 respectively at the inner and outer sides of each of the lenses 10.

The rimless spectacles further comprise a frame which comprises two temple units 2 and a bridge 3. The temple units 2 are arranged to correspondingly couple with two outer sides of the lenses 10 respectively, and the bridge 3 is adapted to couple with two inner sides of the lenses 10 respectively.

The rimless spectacles further comprises a plurality of second connectors 30 of the connection mechanism provided at the temple units 2 and the bridge 3 respectively, wherein the second connectors 30 are detachably engaged with the first connectors 20 at the lenses 10 to couple the temple units 2 and the bridge 3 with the lenses 10 to form the rimless spectacles without any tool.

As shown in FIG. 3, each of the first connectors 20 is a coupling slot 20 indently formed at the peripheral edge 13 of the respective lens 10 to define two spaced apart opening edges 21 at the peripheral edge 13 and an opening 211 between the opening edges 21.

More specifically, the coupling slot 20 has two side surfaces 22 and an enlarged arc surface 23 extending therefrom to form a coupling groove 25, wherein the two side surfaces 22 are facing toward each other and are inwardly extended from two opening edges 21 respectively. The distance between the two side surfaces 22 is larger than the distance between the two opening edges 21 such that the width of the opening 211 is smaller that the distance between the two side surfaces 22.

The arc surface 23, which is integrally extended from the two side surfaces 22 respectively, defines a curved contacting surface 24, wherein the coupling groove 25, which is the coupling slot 20, is defined within the two side surfaces 22 and the curved contacting surface 24.

Figure 4:
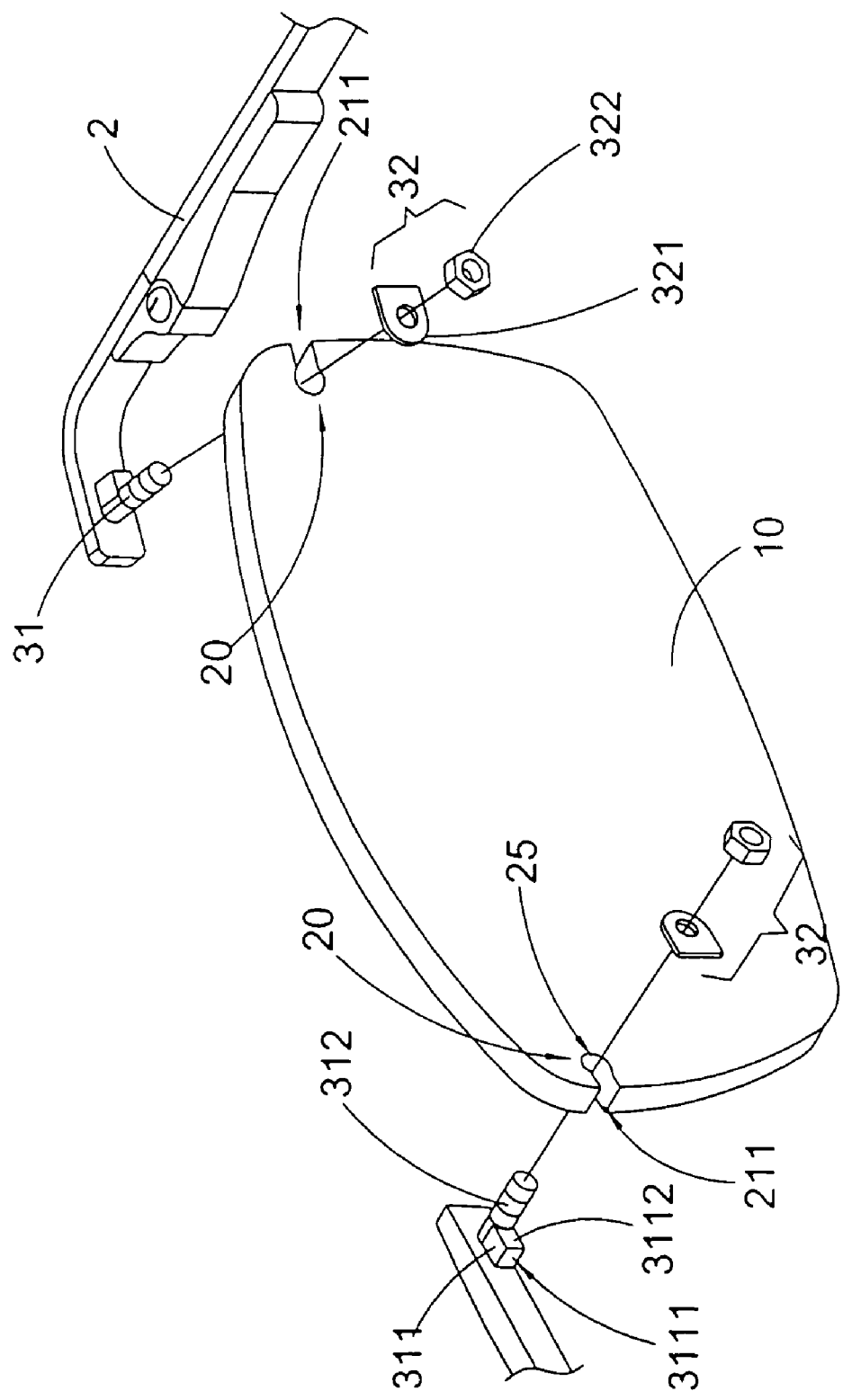
FIG. 4 is a schematic view of the structure of the rimless spectacles according to the first embodiment of the present invention, illustrating the assembling structure of the rimless spectacles.
Figure 5:
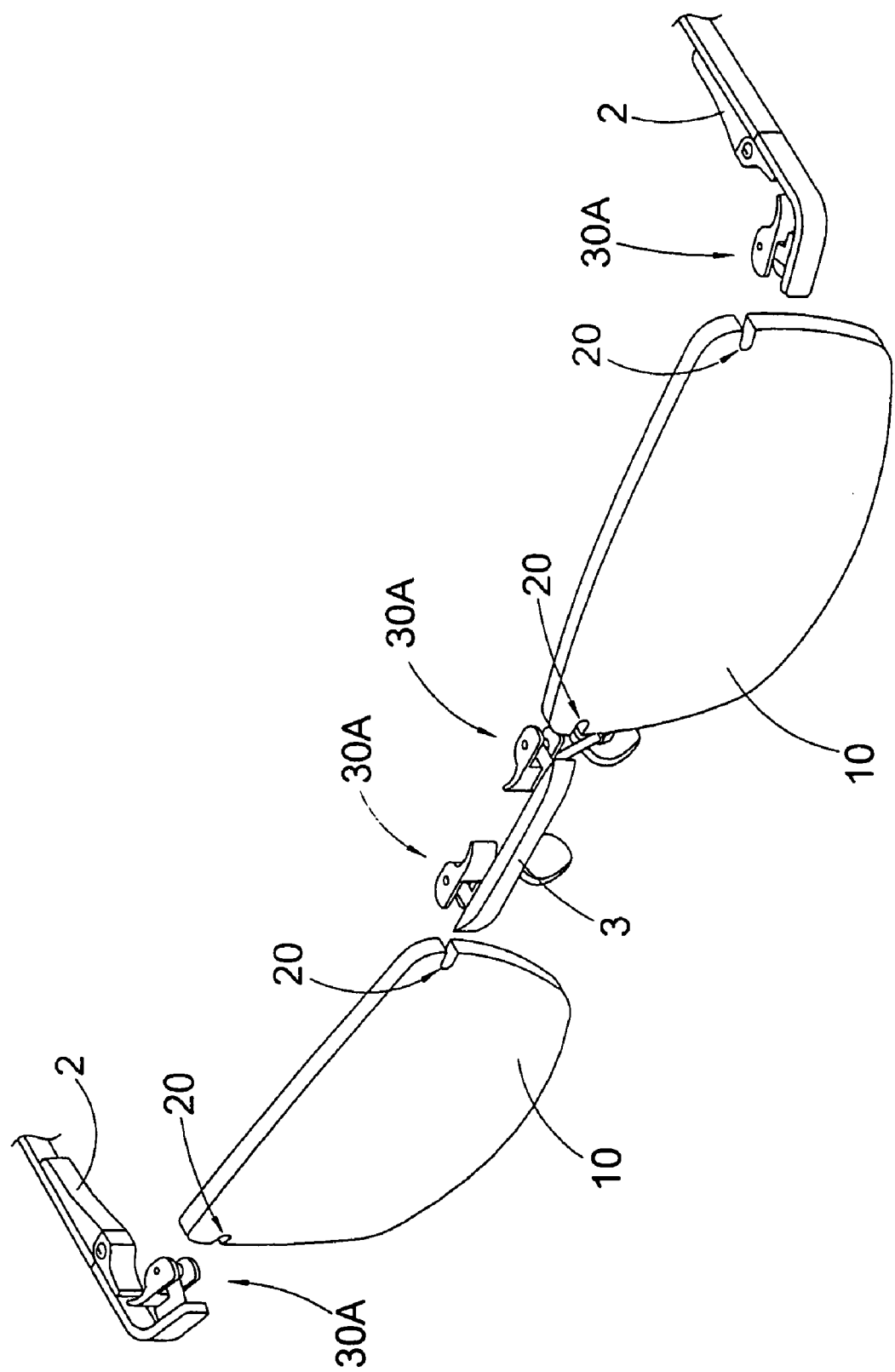
FIG. 5 is an exploded perspective view of the rimless spectacles according to a second embodiment of the present invention.
Figure 6:
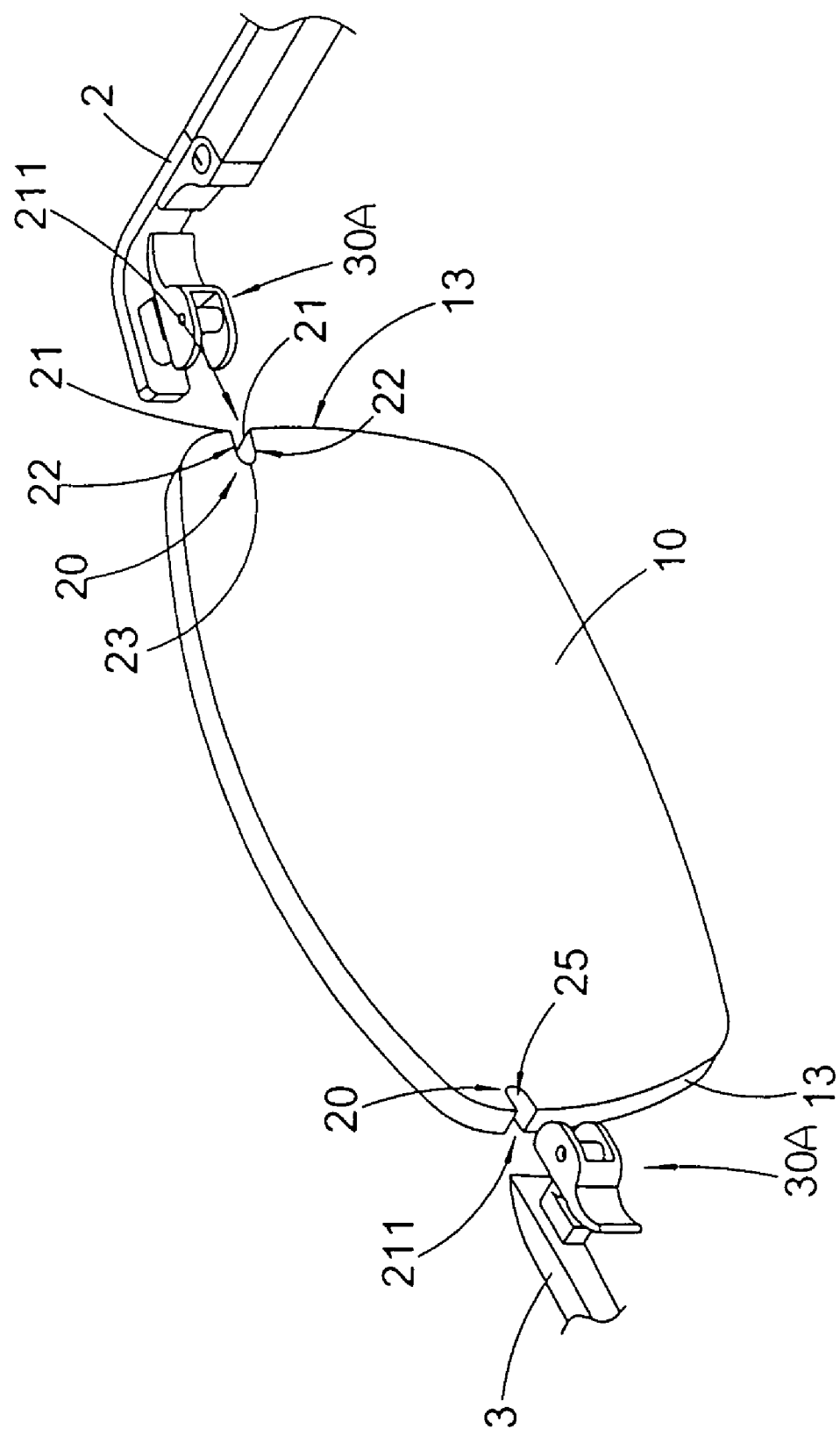
FIG. 6 is an exploded perspective view of the structure of the rimless spectacles according to the second embodiment of the present invention.
Figure 8:
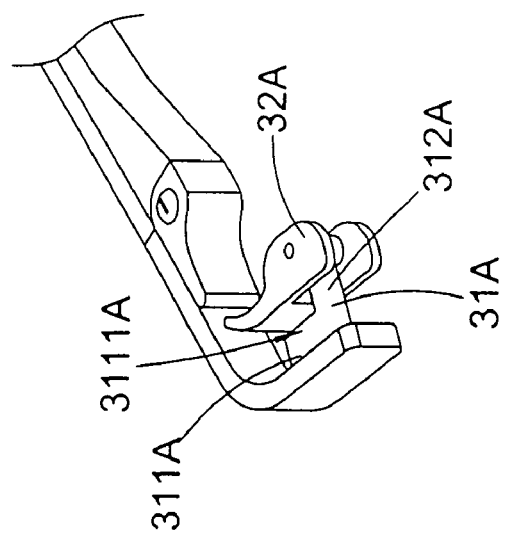
FIG. 8 is a schematic view of the second connector of the rimless spectacles according to the second embodiment of the present invention.
Figure 7:
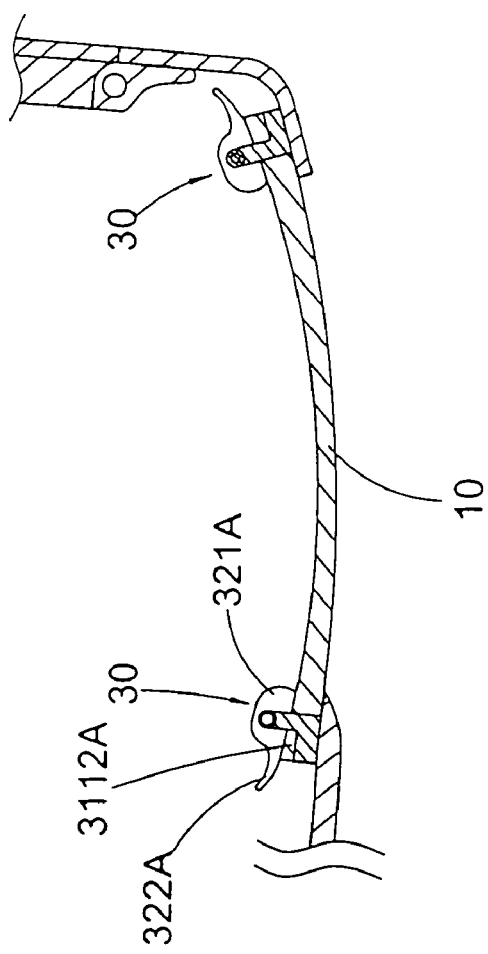
FIG. 7 is a sectional view of the structure of the rimless spectacles according to the second embodiment of the present invention.

Referring to FIG. 2 and FIG. 4, each of the second connectors 30 comprises a retention element 31 and a fastening element 32, wherein the retention elements 31 are provided at the temple units 2 and the bridge 3 respectively. Each of the connecting elements 31 comprises a retention inserter 311 and a coupling inserter 312 extended from the retention inserter 311. The shape of the retention inserter 311 is designed correspondingly to the shape coupling groove 25. The retention inserter 311 has a retention surface 3111 and a biasing surface 3112, wherein the retention surface 3111 is shaped and sized corresponding to the curved contacting surface 24. When the retention inserter 311 is slidably engaged with the coupling slot 20, the retention surface 3111 of the retention inserter 311 is biased against the curved contacting surface 24 to securely retain the second connector 30 at the predetermined location of the respective lens 10.

Accordingly, the coupling inserter 312 is integrally extended from the retention inserter 311. More specifically, the coupling inserter 312 is integrally protruded from the retention inserter 311.

The fastening element 32, corresponding to the retention element 31, comprises a locking panel 321 and a locking unit 322. When the second connector 30 is placed at the coupling slot 20 of the lens 10, the second connector 30 is fastened thereat via the locking panel 321 and the locking unit 322. In other words, after the retention inserter 311 is slidably inserted into the coupling groove 25 at the front side 11 of the respective lens 10, the locking panel 321 is slidably biased against the biasing surface 3112 through the coupling inserter 312 at the rear side 12 of the lens 10, such that the locking unit 322 is locked at the coupling inserter 312 to form a secured locking structure between the first and second connectors 20, 30. Therefore, the locking structures of the first and second connectors 20, 30 achieve the goal of fast and firmly connecting the temple units 2 and the bridge 3 with the lenses 10 to form the entire body rimless structure of the spectacles, as shown in FIG. 1.

Since the coupling slot 20 in the present invention is continuous channel defined by two opening edges 21 which are inwardly extended, such that it is unnecessary to drill any hole on the lenses 10 in the present invention. Technicians can easily cut at the peripheral edge 13 inwardly to form two side surfaces 22 and the arc surface 23 to form the coupling slot 20.

As shown in FIGS. 5 to 8, the rimless spectacles of a second embodiment illustrate an alternative mode of the first embodiment of the present invention. Accordingly, the distance between the two side surfaces 22 equals to the width of the opening 211. In other words, the two side surfaces 22 are extended in a parallel manner. Each of the second connectors 30A comprises a connecting member 31A and a clipping member 32A, wherein the connecting members 31A are provided at the temple units 2 and the bridge 3 respectively. Each of the connecting members 31A comprises a retention inserter 311A and a coupling shaft 312A, wherein the retention inserter 311A has a shape and size corresponding to the shape and size of the respective coupling slot 25. Each of the retention inserters 311A has a retention surface 3111A and a biasing surface 3112A, wherein the retention surface 3111A is shaped and sized corresponding to the curved contacting surface 24. When the retention inserter 311A is slidably inserted into the corresponding coupling slot 20 inwardly from the peripheral edge 13 of the lens 10, the retention surface 3111A of the retention inserter 311A is biased against the curved contacting surface 24 to securely retain the second connector 30A at the predetermined location of the respective lens 10.

Accordingly, the coupling shaft 312A is coupled with the retention inserter 311A. More specifically, the coupling shaft 312A is coupled with the retention inserter 311A to bias against the biasing surface 3112A thereof.

The clipping member 32A is pivotally engaged with connecting member 31A, wherein the clipping member 32A comprises a pressuring clipper 321A and a trigger 322A. The pressuring clipper 321A is pivotally coupled with the coupling shaft 312A of the connecting member 31A while the trigger 322A is extended from the pressuring clipper 321A. When the connecting member 31A of the second connector 30A is slidably inserted into the coupling slot 20 at the peripheral edge 13 of the lens 10, the trigger 322A is actuated to pivotally move the pressuring clipper 321A to bias against the biasing surface 3112A at the rear side 12 of the lens 10 such that temple units 2 and the bridge 3 can be quickly and firmly engaged with the lenses 10 by the clipping force.

Figure 9:
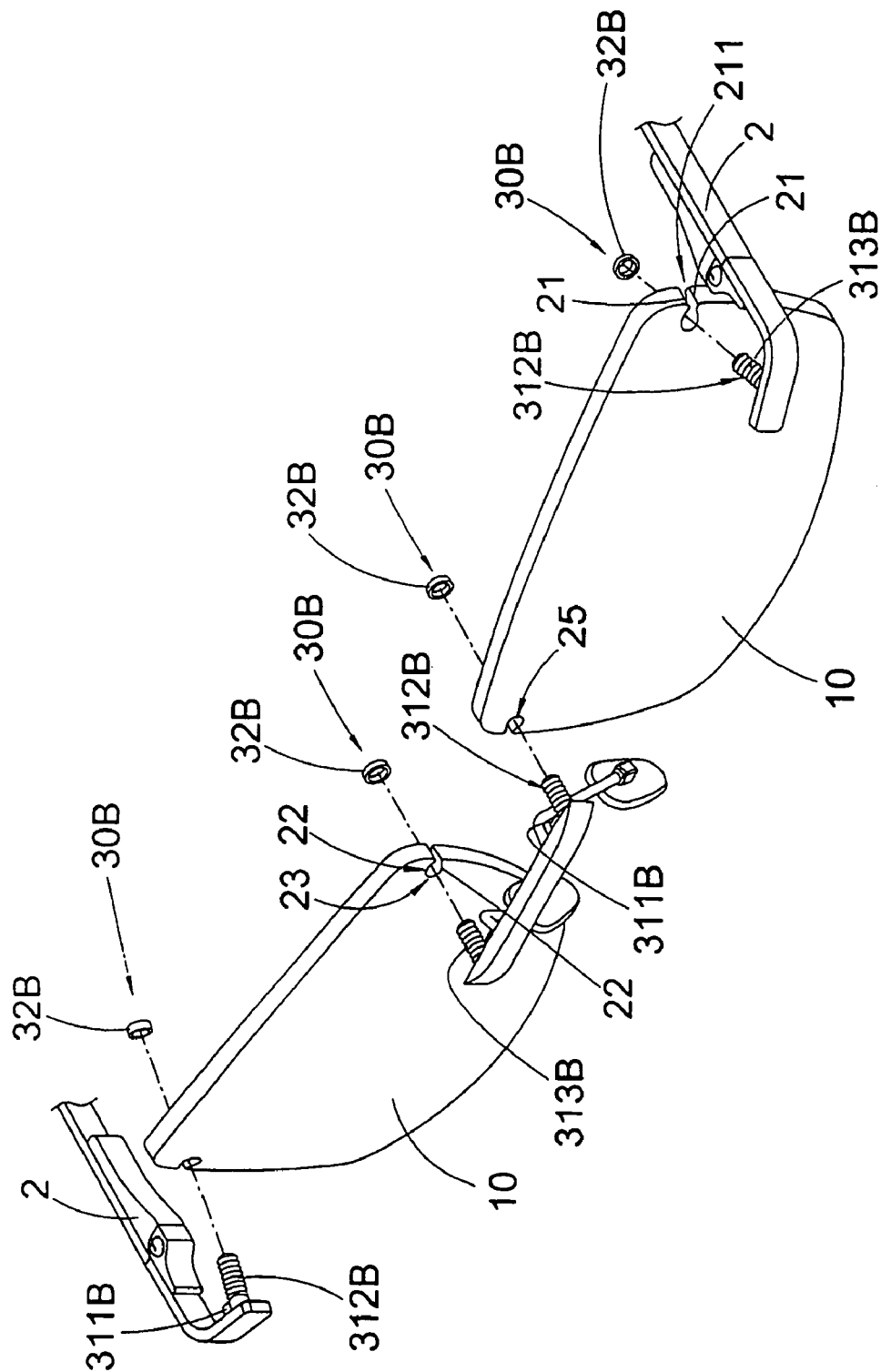
FIG. 9 is an exploded perspective view of the rimless spectacles according to a third embodiment of the present invention.
Figure 10:
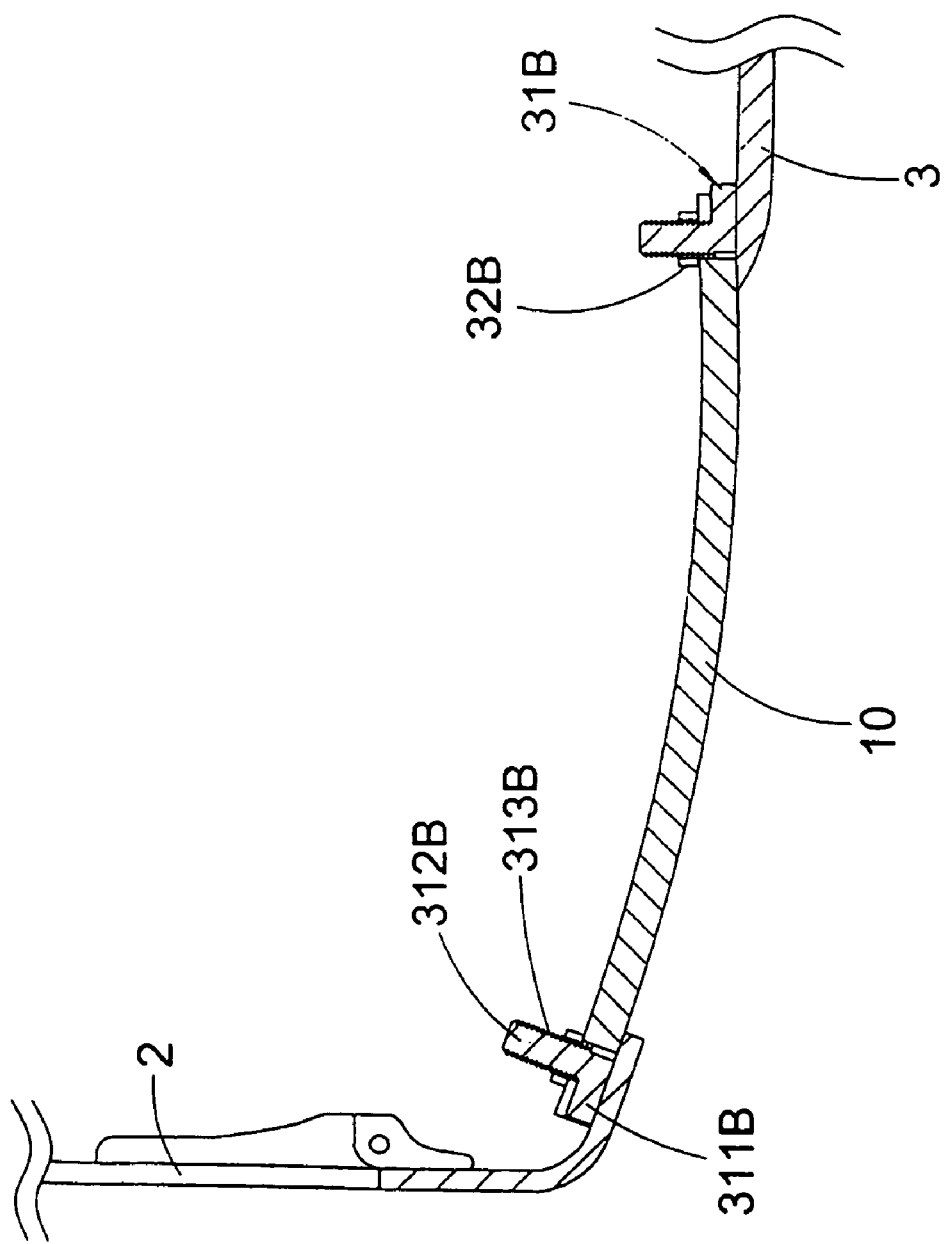
FIG. 10 is a sectional view of the structure of the rimless spectacles according to the third embodiment of the present invention.
Figure 11:
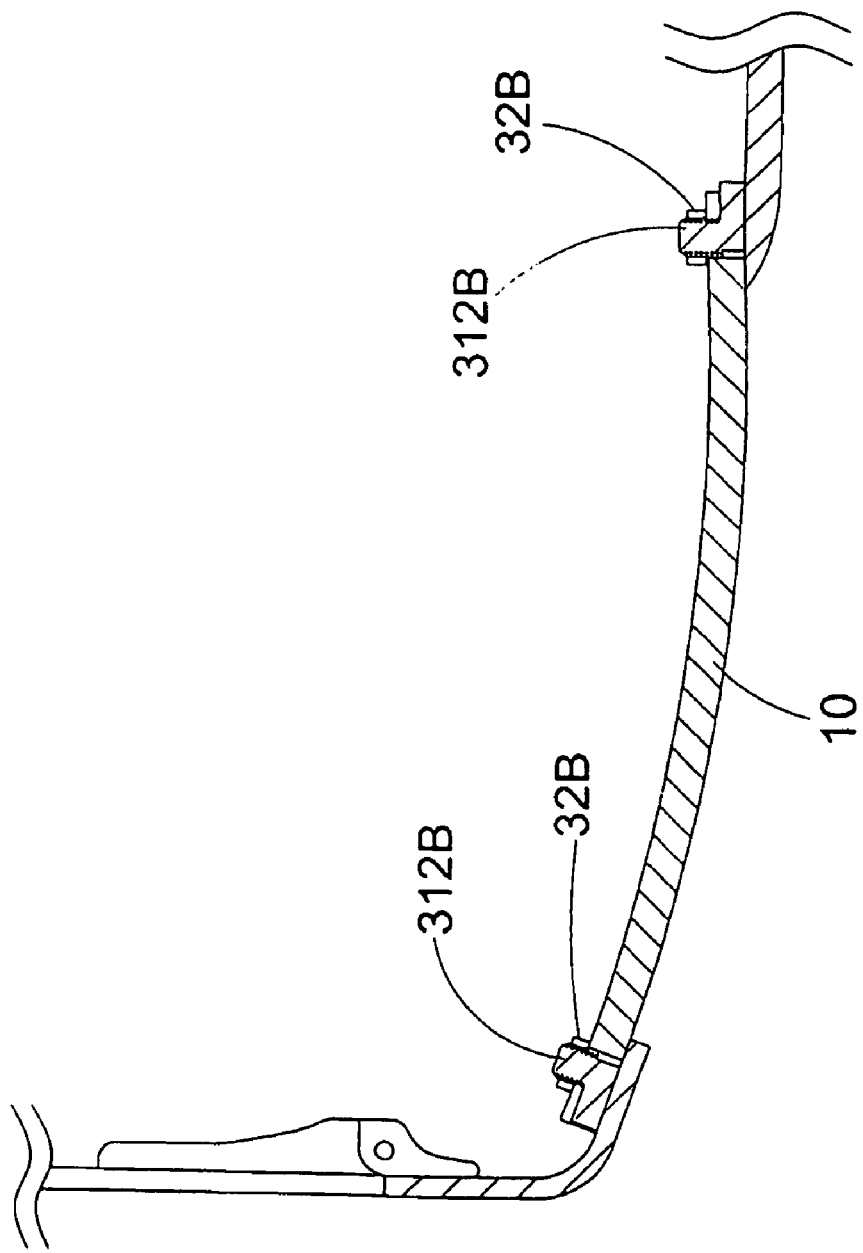
FIG. 11 illustrates an alternative mode of the structure of the rimless spectacles according to the third embodiment of the present invention.

As shown in FIGS. 9 to 11, the rimless spectacles of a third embodiment illustrate an alternative mode of the first embodiment of the present invention. The second connector 30B comprises a retention element 31B and a fastening element 32B, wherein the retention element 31B are provided at the temple units 2 and the bridge 3 respectively. Each of the retention element 31B comprises a retention inserter 311B and a coupling inserter 312B extended from the retention inserter 311B. The shape of the retention inserter 311B is designed correspondingly to the shape coupling groove 25. The retention inserter 311B has a retention surface 3111B and a biasing surface 3112B, wherein the retention surface 3111B is shaped and sized corresponding to the curved contacting surface 24. When the retention inserter 311B is slidably engaged with the coupling slot 20, the retention surface 3111B of the retention inserter 311B is biased against the curved contacting surface 24 to securely retain the second connector 30B at the predetermined location of the respective lens 10. Accordingly, the thickness of the retention inserter 311B is smaller than a length of the coupling slot 20, such that when the retention inserter 311B is slidably inserted into the coupling slot 20 at the front side 11 of the lens 10, the retention inserter 311B is disposed within the coupling slot 20. Since the distance between the opening edges 21 is smaller than that the distance between the side surfaces 22, the retention inserter 311B is securely retained within the coupling slot 20 so as to prevent the lateral movement of the retention inserter 311B. In other words, the temple units 2 and the bridge 3 can be fastened with the lenses 10 as long as the outward movement of the second connectors 30B is avoided.

Accordingly, the coupling inserter 312B is extended from the retention inserter 311B. More specifically, the coupling inserter 312B is protruded from the retention inserter 311B, wherein the coupling inserter 312B is made of flexible material and is formed with an outer threaded circumferential surface 313B, such that the coupling inserter 312B is adapted to be selectively cut by a tool or other cutting equipment to reduce the length of the coupling inserter 312B.

The fastening element 32B, having a ring shape, is arranged to engage with the coupling inserter 312B. When the retention member 31B of the second connector 30B is inserted into the coupling slot 20 at the front side 11 of the lens 10, the fastening element 32B is rotatably engaged with the outer threaded circumferential surface 313B of the coupling inserter 312B at the rear side 12 of the lens 10, so as to securely lock up the fastening element 32B at the rear side 12 of the lens 10. In other words, the first and second connectors 20, 30B provide a fast and firm connection to couple the temple units 2 and the bridge 3 with the lenses 10. Thereafter, a portion of the coupling inserter 312B rearwardly protruding out of the fastening element 32B can be cut to reduce the length of the coupling inserter 312B so as to allow the fastening element 32B tightly engaging with the coupling inserter 312B and avoid exposure of unused portion of the coupling inserter 312B, as shown in FIG. 11.

Figure 12:
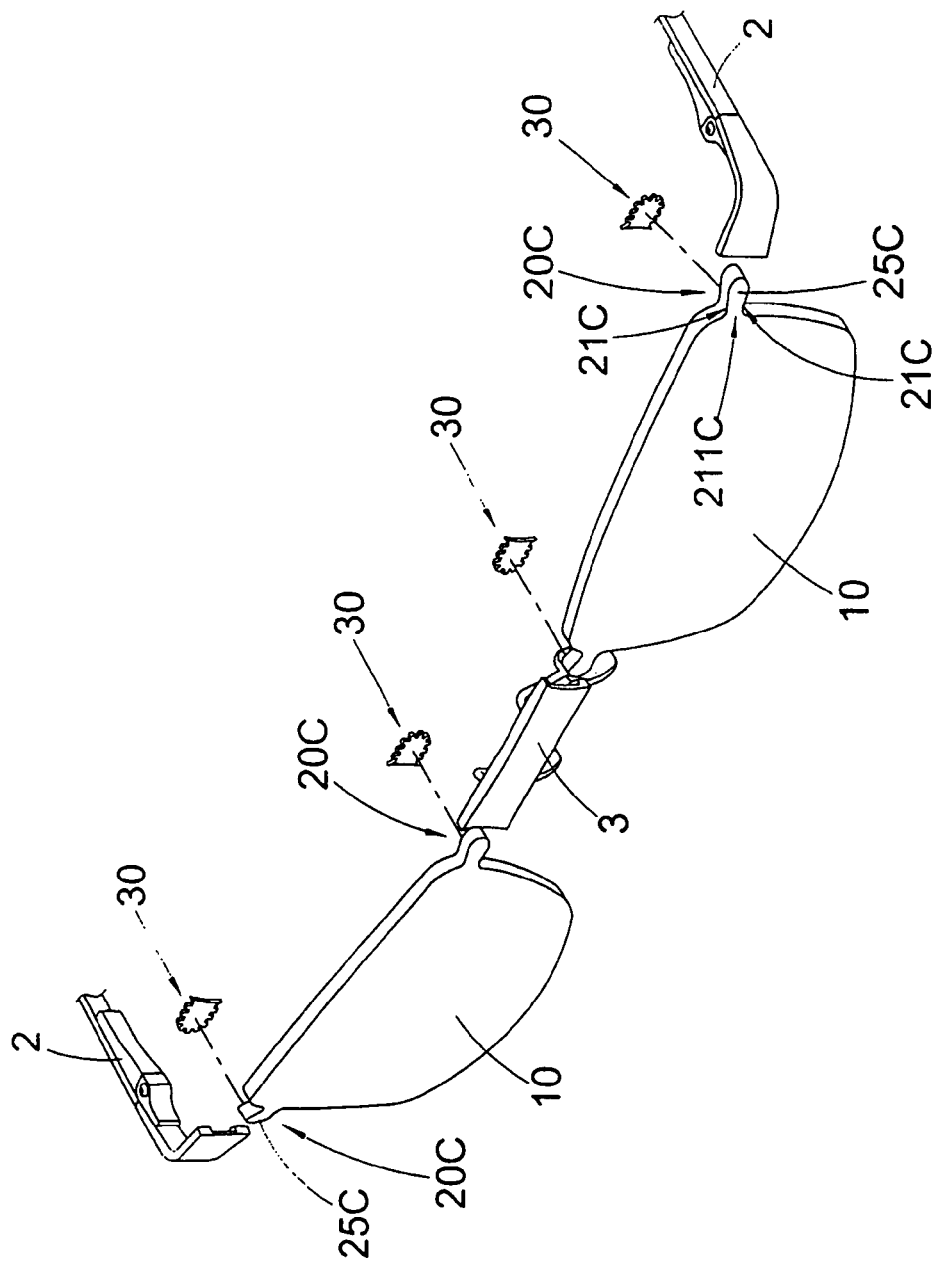
FIG. 12 is an exploded perspective view of the rimless spectacles according to a fourth embodiment of the present invention.
Figure 13:
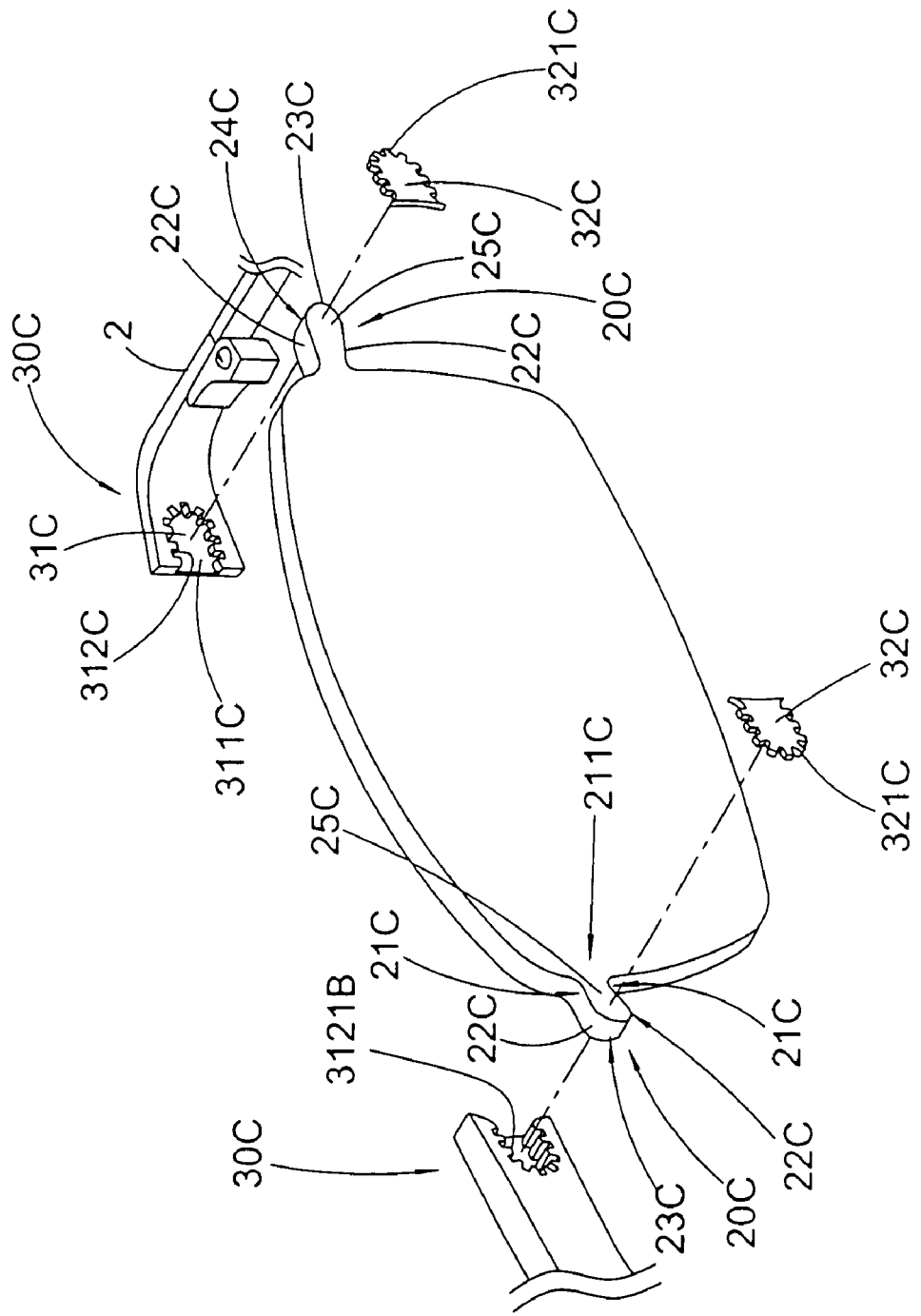
FIG. 13 is an exploded view of the rimless spectacles according to the fourth embodiment of the present invention, illustrating the relationship between the first and second connectors.
Figure 14:
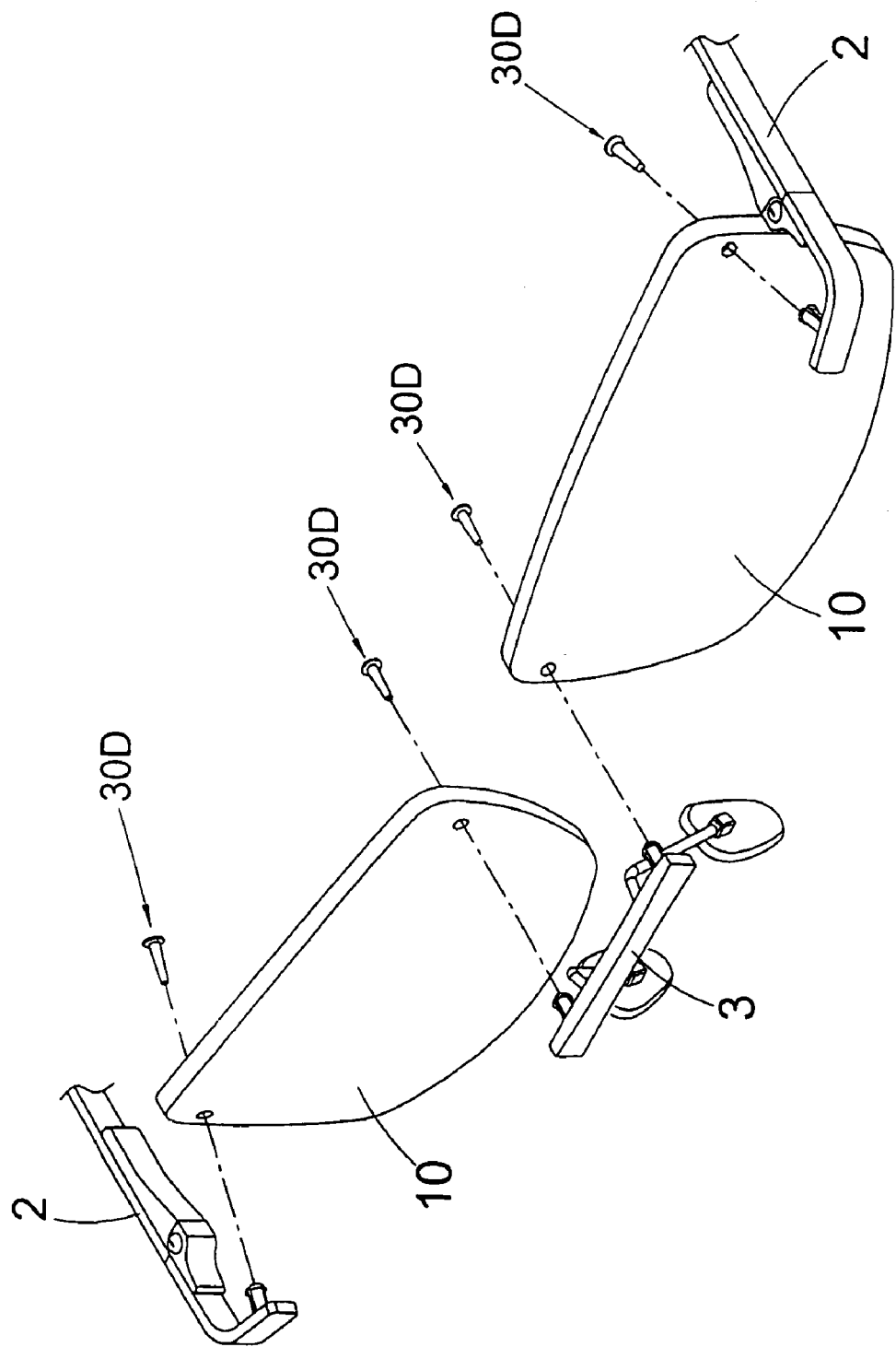
FIG. 14 is an exploded perspective view of the rimless spectacles according to a fifth embodiment of the present invention.
Figure 15:
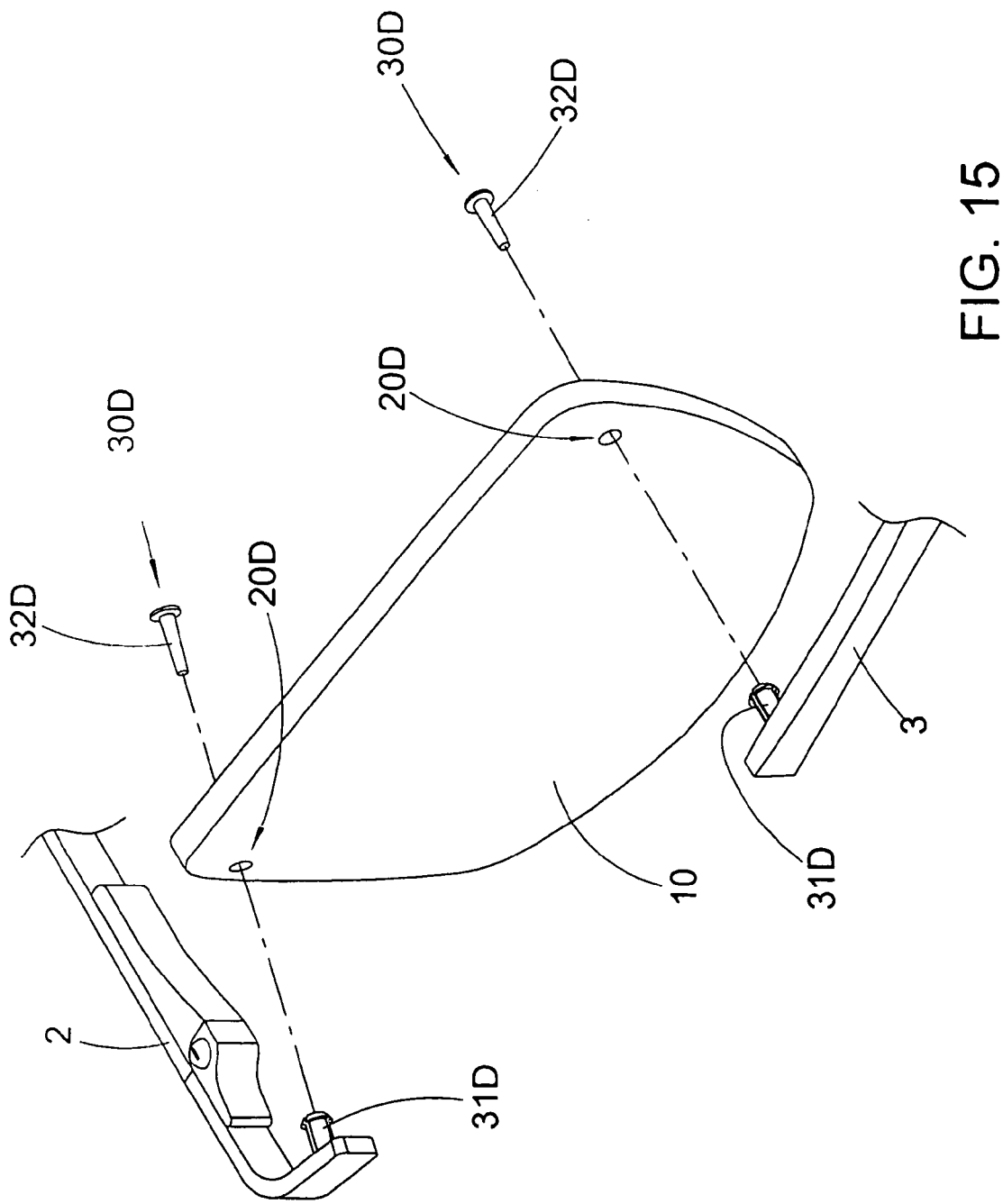
FIG. 15 is an exploded view of the rimless spectacles according to the fifth embodiment of the present invention, illustrating the relationship between the first and second connectors.

As shown in FIGS. 12 to 13, the rimless spectacles of a fourth embodiment illustrate an alternative mode of the first embodiment of the present invention. Each of the first connectors 20C is an engaging arm 20 integrally and outwardly protruded from the peripheral edge 13 of the respective lens 10, wherein each of the engaging arm 20C has two engaging edges 21C formed at the peripheral edge 13 of the respective lens 10. The engaging edges 21C are provided at the peripheral edge 13 with a predetermined separating distance 211C.

Each of the engaging arms 20C further has two engaging surfaces 22C and an arc surface 23C, wherein the two engaging surfaces 22C, which are the two lateral surfaces of the engaging arms 20C, are extended from the engaging edges 21C respectively. The distance between the two engaging surfaces 22C is larger than the separating distance 221C between the two engaging edges 21C.

The arc surface 23 is integrally extended between the two engaging surfaces 22C to form a curved contacting surface 24C from one of the engaging surfaces 22C to another engaging surface 22C through the arc surface 23. In addition, a protrusion connector 25C is formed by the encirclement of the curved contacting surface 24C.

As shown in FIG. 13, the second connectors 30C are provided at the temple units 2 and the bridge 3 respectively, wherein each of the second connectors 30C has a coupling groove 31C and a retention panel 32C. In other words, the coupling grooves 31C are indently formed at the predetermined locations of the temple units 2 and the bridge 3 respectively. Accordingly, each of the coupling grooves 31C has a bottom wall 311C and a peripheral wall 312C biasing against the curved contacting surface 24C, wherein a plurality of engaging teeth 3121C are formed at the peripheral wall 312C.

The retention panel 32C is shaped and sized corresponding to the coupling groove 31C such that the retention panel 32C can be fitted into the coupling groove 31C. In addition, a plurality of retention teeth 321C are formed at the retention panel 32C to engage with the engaging teeth 3121C when the retention panel 32C is engaged with the coupling groove 31C. Therefore, after the protrusion connector 25C of the engaging arm 20C is slidably engaged with the respective coupling groove 31C, the retention panel 32C is then engaged with the coupling groove 31C at the rear side 12 of the lens 10 to sandwich the engaging arm 20C between the bottom wall 311C of the coupling groove 31C and the retention panel 32C, so as to securely and rapidly couple the temple units 2 and the bridge 3 with the lenses 10. It is worth to mention that an adhesive can be applied to the engaging arms 20C to affix to the coupling grooves 31C respectively to hold the engaging arms 20C in position.

Figure 18:
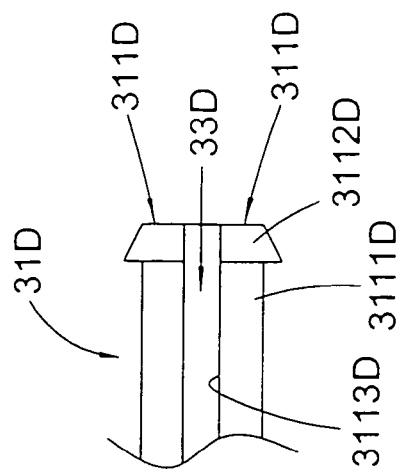
FIG. 18 is a schematic view of the second connector of the rimless spectacles according to the fifth embodiment of the present invention.
Figure 17:
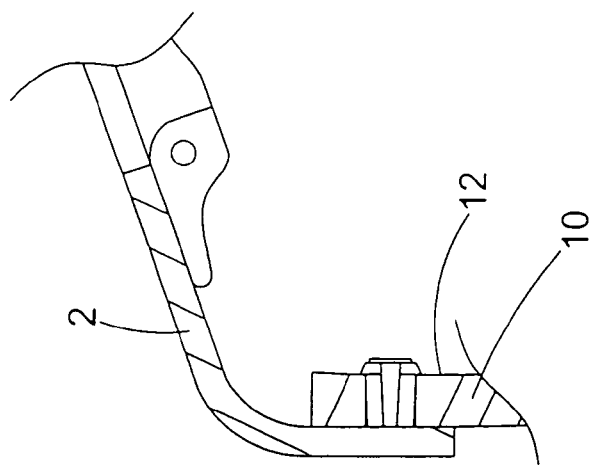
FIG. 17 is a sectional view of the structure of the rimless spectacles according to the fifth embodiment of the present invention, illustrating the connection between the first and second connectors.
Figure 16:
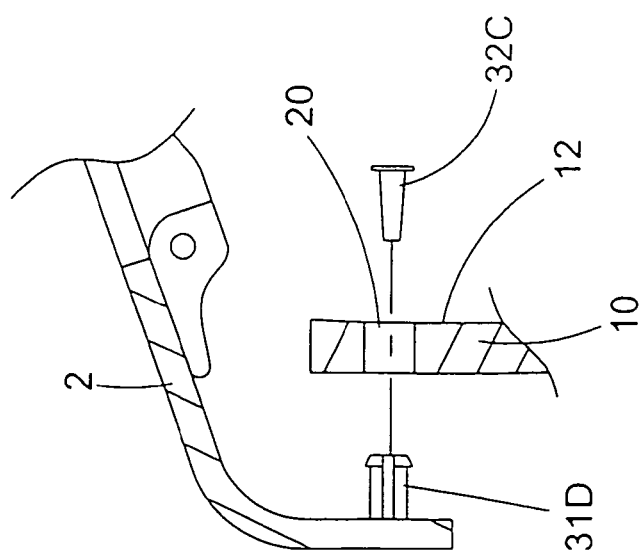
FIG. 16 is a sectional view of the structure of the rimless spectacles according to the fifth embodiment of the present invention, illustrating the relationship between the first and second connectors.

As shown in FIGS. 14 to 17, the rimless spectacles of a fifth embodiment illustrate an alternative mode of the first embodiment of the present invention. The first connector 20D is a through engaging slot 20D provided at the predetermined location of the lens 10. Each of the second connectors 30D comprises a connecting member 31D and a retention member 32D, wherein the connecting members 31D are provided at the predetermined locations of the temple units 2 and the bridge 3 respectively. Accordingly, each of the connecting members 31D is made of elastic material such as plastic. As shown in FIG. 18, each of the connecting members 31D comprises an elastic inserter 311D having a tubular structure, wherein each of the elastic inserter 311D has an elongated body 3111D, an enlarged head 3112D extended from an end of the elongated body 3111D, and an inner circumferential surface 3113D. In other words, the elongated body 3111D and the enlarged head 3112D of each of the elastic inserter 311D form an inserting plug. In addition, an inserting cavity 33D is formed within the inner circumferential surface 3113D of each of the elastic inserter 311D. In other words, when the elastic inserter 311D is slidably passed through the respective engaging slot 20D at the front side of the lens 10, the enlarged head 3112D is located at the rear side of the lens 10.

Each of the retention members 32D is slidably inserted into the inserting cavity 33D of the respective elastic inserter 311D. Accordingly, after the elastic inserter 311D is slidably inserted through the respective engaging slot 20D at the lens 10, the retention members 32D is then slidably inserted into the inserting cavity 33D of the respective elastic inserter 311D at the rear side of the lens 10 so as to apply an outward pushing force against the elastic inserter 311D. Therefore, the temple units 2 and the bridge 3 can be securely coupled with the lenses 10D to form the rimless structure.

Figure 19:
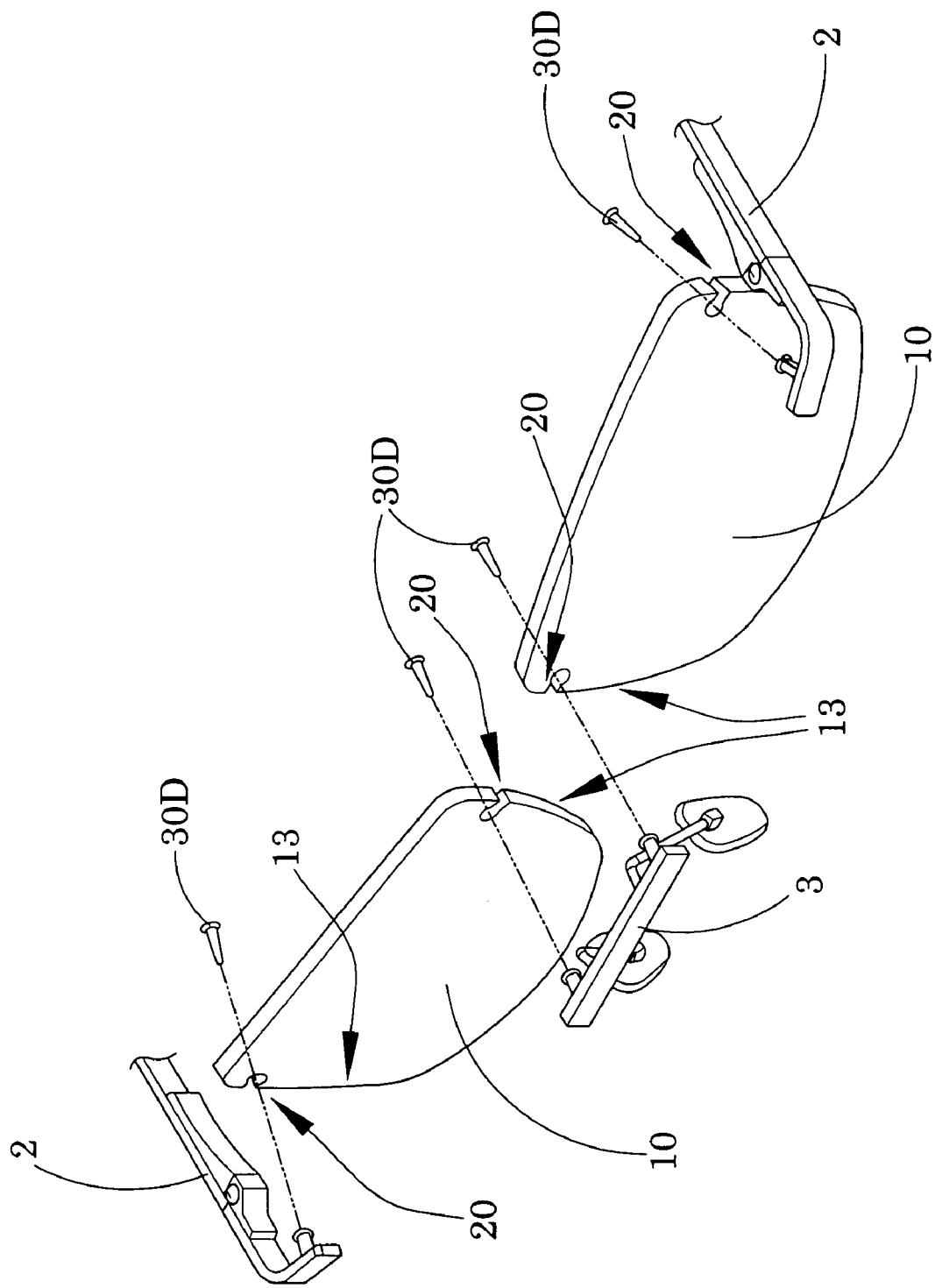
FIG. 19 illustrates an alternative mode of the rimless spectacles according to the above fifth embodiment of the present invention.
Figure 20:
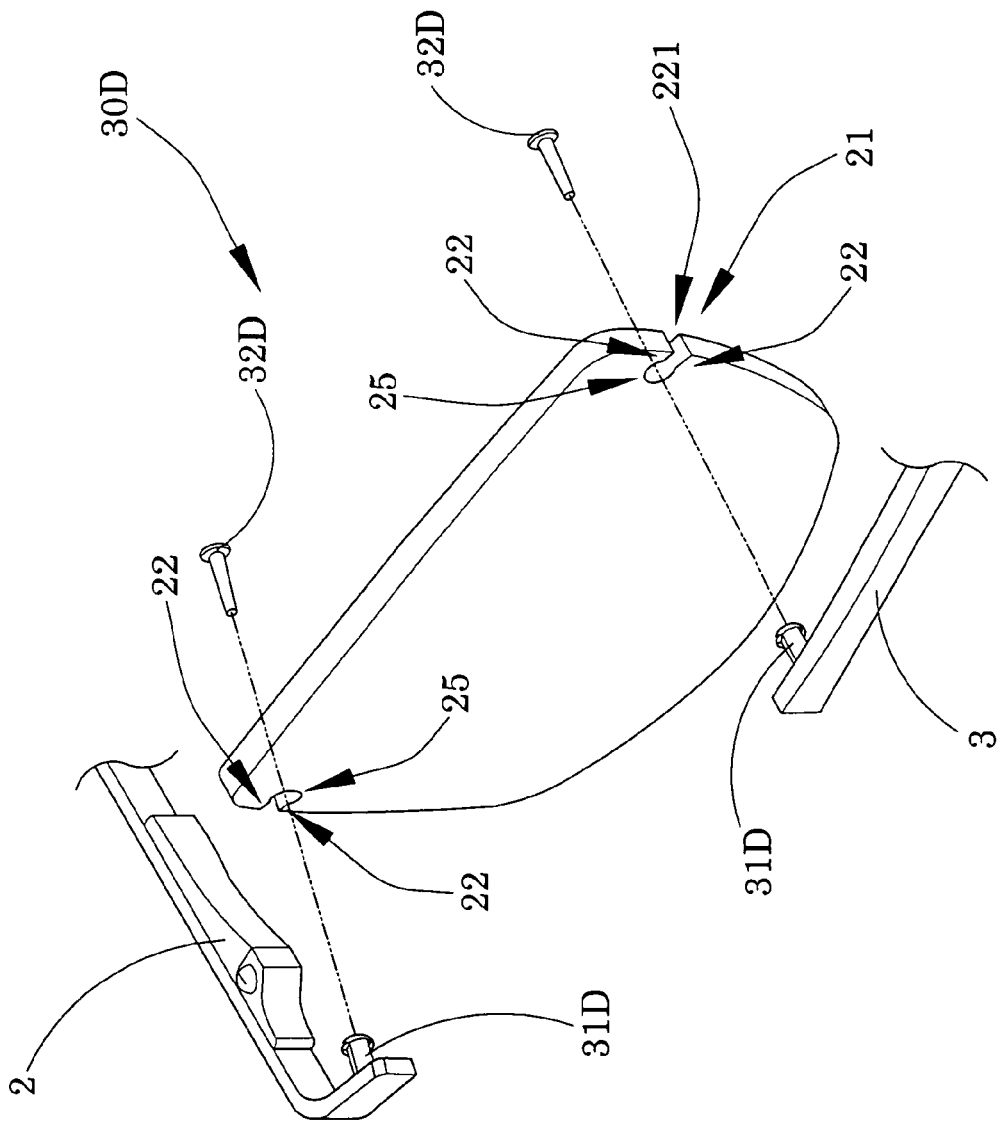
FIG. 20 is an exploded view of the alternative mode of the rimless spectacles according to the fifth embodiment of the present invention.
Figure 21:
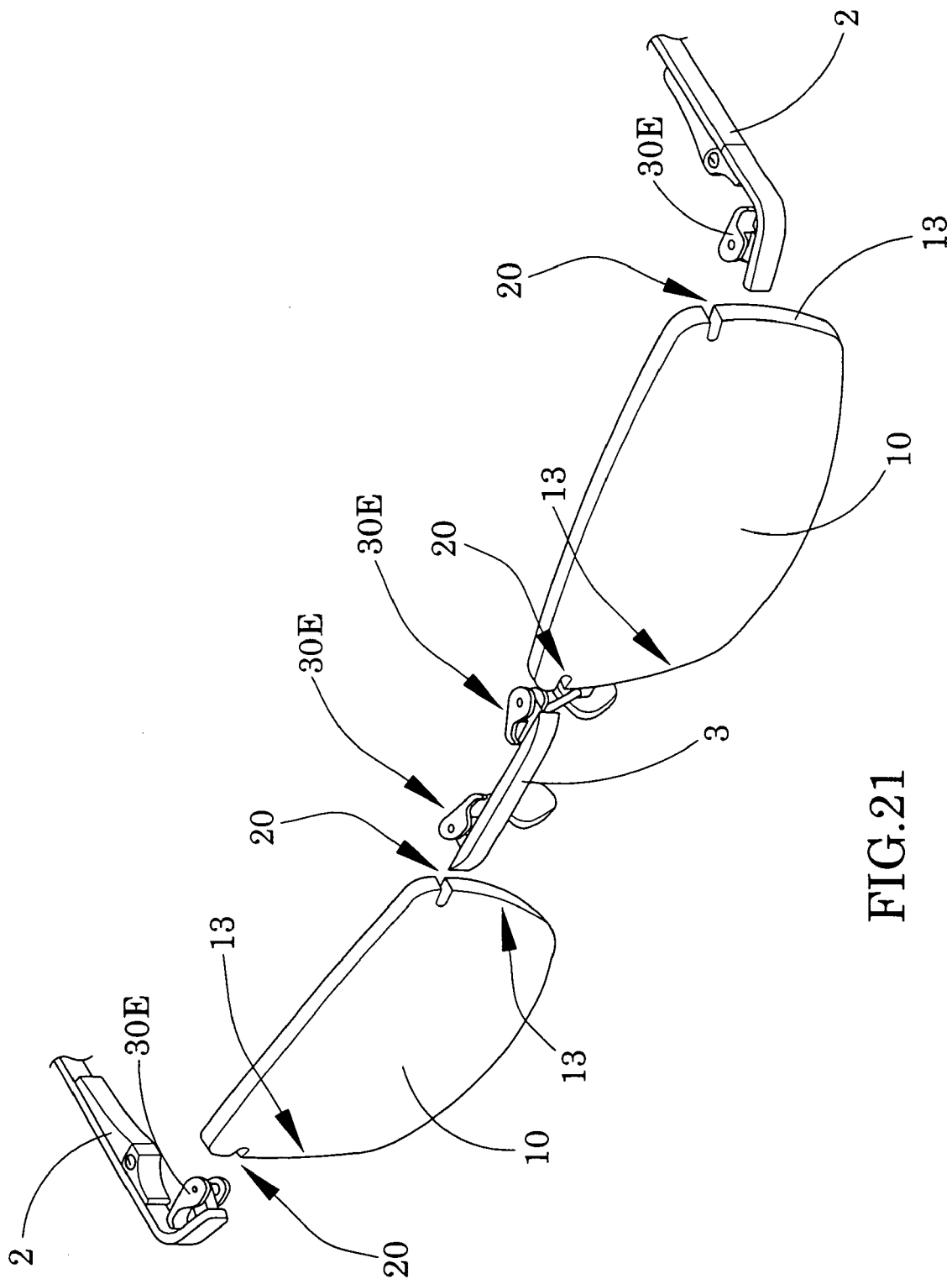
FIG. 21 is an exploded perspective view of the rimless spectacles according to a sixth embodiment of the present invention.
Figure 22:
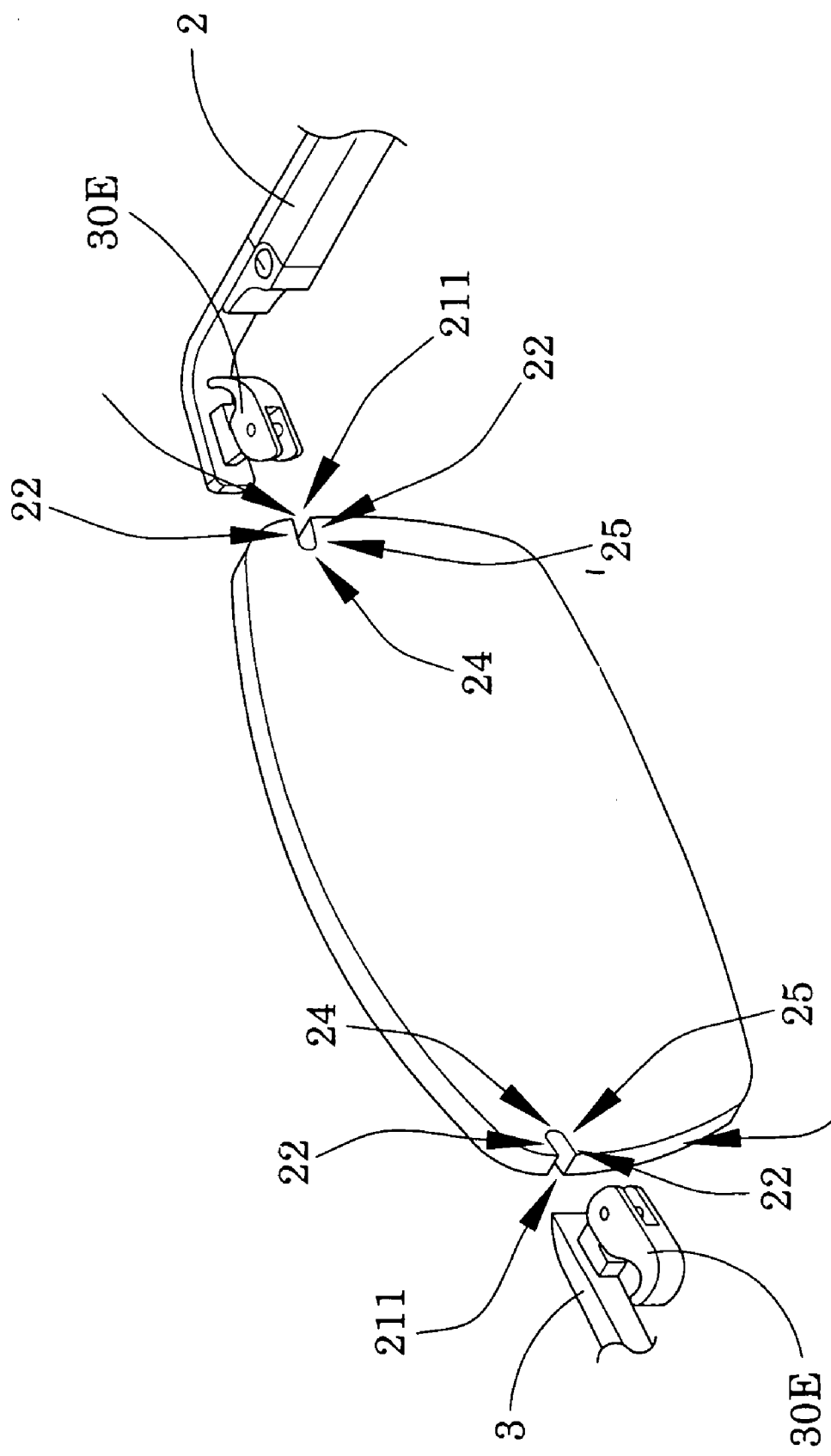
FIG. 22 is an exploded perspective view of the structure of the rimless spectacles according to the sixth embodiment of the present invention.

FIGS. 19 and 20 illustrate an alternative mode of the rimless spectacles of the fifth embodiment, wherein the second connectors 30D is adapted to incorporate with the first connector 20 as shown in FIG. 3. As shown in FIGS. 3, 19, and 20, each of the first connectors 20 is a coupling slot 20 indently formed at the peripheral edge 13 of the respective lens 10 to define the opening edges 21 and the coupling groove 25. As it is mentioned above, the distance between the two side surfaces 22 is larger than the distance between the two opening edges 21 such that the width of the opening 211 is smaller that the distance between the two side surfaces 22. Preferably the coupling groove 25 has a size slightly larger than the circumferential size of the elastic inserter 311D.

When the elastic inserter 311D is slidably passed through the respective coupling slot 20 at the front side of the lens 10, the enlarged head 3112D is located at the rear side of the lens 10. In particularly, the elongated body 3111D of the elastic inserter 311D is biased against the side surfaces 22 of the coupling slot 20 when the retention member 32D is slidably inserted into the inserting cavity 33D of the respective elastic inserter 311D. It is worth to mention that the size of the elastic inserter 311D does not require to precisely match with the size of the coupling slot 20 in order to mount the elastic inserter 311D to the coupling slot 20. In other words, the size of the coupling slot 20 can be made not to precisely match with the elastic inserter 311D so as to reduce the manufacturing cost and defect of the optical lens 10 in responsive to the coupling slot 20.

FIGS. 21 to 24 illustrate an alternative mode of the rimless spectacles of the second embodiment. As shown in FIG. 21 to 24, each of the second connectors 30E comprises a connecting member 31E and a clipping member 32E, wherein the connecting members 31E are provided at the temple units 2 and the bridge 3 respectively. Each of the connecting members 31A comprises a retention inserter 311E and a coupling shaft 312E, wherein the retention inserter 311E has a shape and size corresponding to the shape and size of the respective coupling slot 25. Each of the retention inserters 311E has a retention surface 3111E and a biasing surface 3112E, wherein the retention surface 3111E is shaped and sized corresponding to the curved contacting surface 24. When the retention inserter 311E is slidably inserted into the corresponding coupling slot 20 inwardly from the peripheral edge 13 of the lens 10, the retention surface 3111E of the retention inserter 311E is biased against the curved contacting surface 24 to securely retain the second connector 30E at the predetermined location of the respective lens 10.

Accordingly, the coupling shaft 312E is coupled with the retention inserter 311E. More specifically, the coupling shaft 312E is coupled with the retention inserter 311E to bias against the biasing surface 3112E thereof.

The clipping member 32E is pivotally engaged with connecting member 31E, wherein the clipping member 32E comprises a pressuring clipper 321E and a trigger 322E. The pressuring clipper 321E is pivotally coupled with the coupling shaft 312E of the connecting member 31E while the trigger 322E is extended from the pressuring clipper 321E. When the connecting member 31E of the second connector 30E is slidably inserted into the coupling slot 20 at the peripheral edge 13 of the lens 10, the trigger 322E is actuated to pivotally move the pressuring clipper 321E to bias against the biasing surface 3112E at the rear side 12 of the lens 10 such that temple units 2 and the bridge 3 can be quickly and firmly engaged with the lenses 10 by the clipping force.

Figure 23:
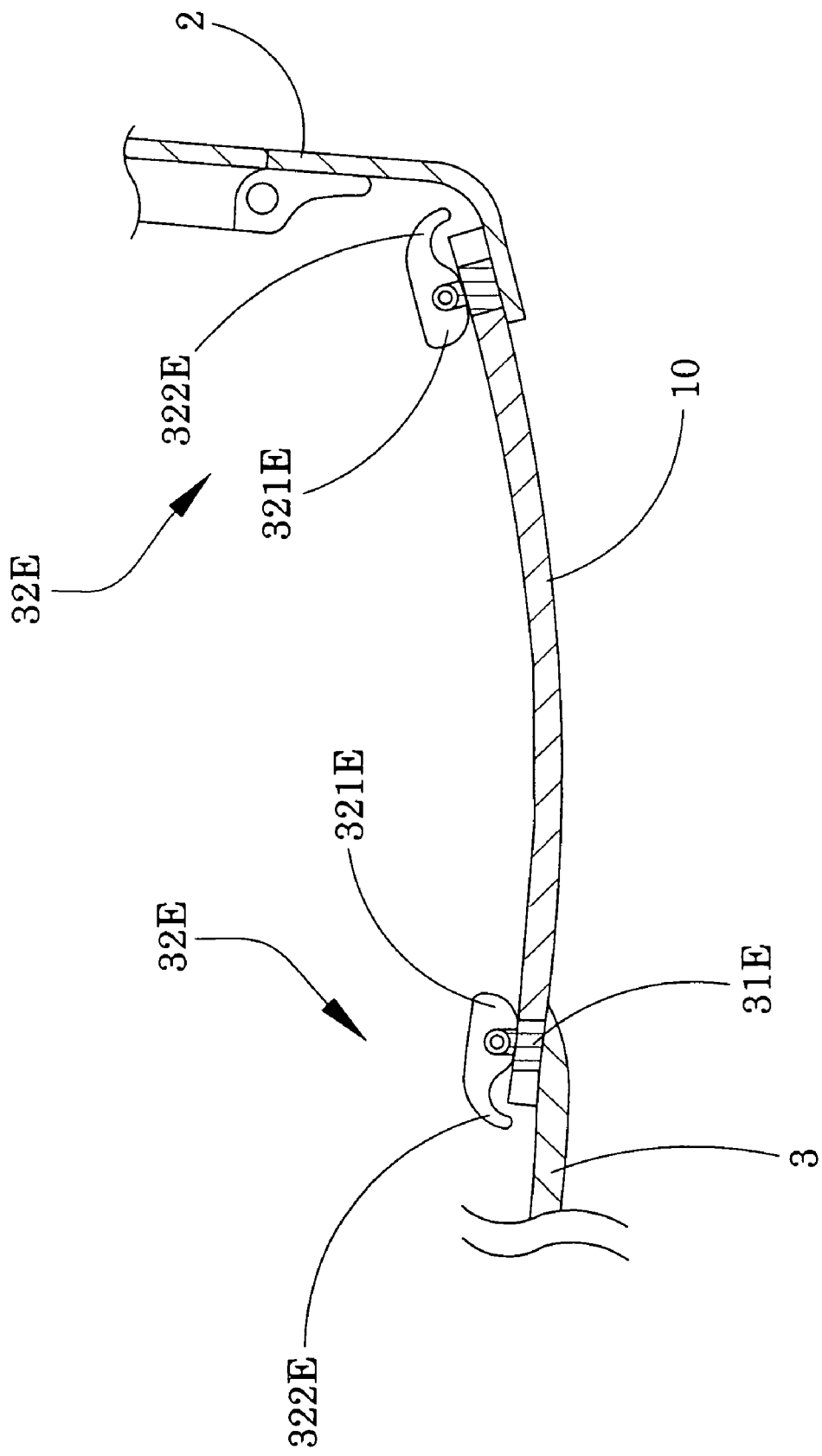
FIG. 23 is a sectional view of the structure of the rimless spectacles according to the sixth embodiment of the present invention.
Figure 24:
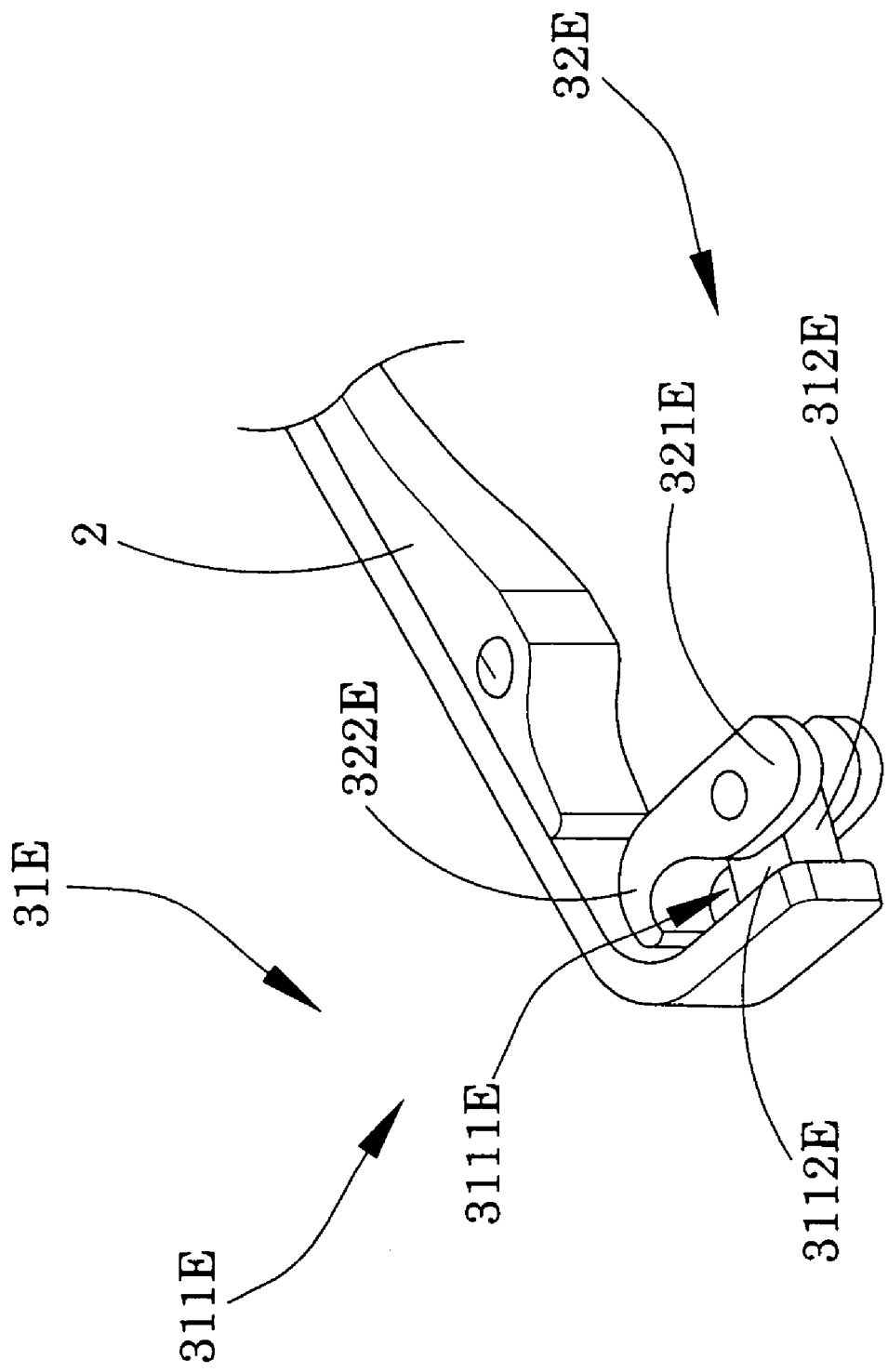
FIG. 24 is a schematic view of the second connector of the rimless spectacles according to the sixth embodiment of the present invention.

Accordingly, the only difference between the second and sixth embodiments is that the direction of the trigger 332A, 322E. Comparing FIG. 7 with FIG. 23, the trigger 322A of the second embodiment has a curved shape curving away from the optical lens 10. In other words, the tip of the trigger 322A is pointing away from the optical lens 10. According to the sixth embodiment, the trigger 322E has a curved shape curving towards the optical lens 10 such that the tip of the trigger 322E is located adjacent to the peripheral edge 13 of the lens 10 as shown in FIG. 23.

Therefore, the four second connectors 30E are aligned and located close to the peripheral edges 13 of the lenses 10 at the inner and outer sides thereof respectively so as to enhance the aesthetic appearance of the rimless spectacles and to enhance the actuating operation of each of the second connectors 30E.

Figure 25:
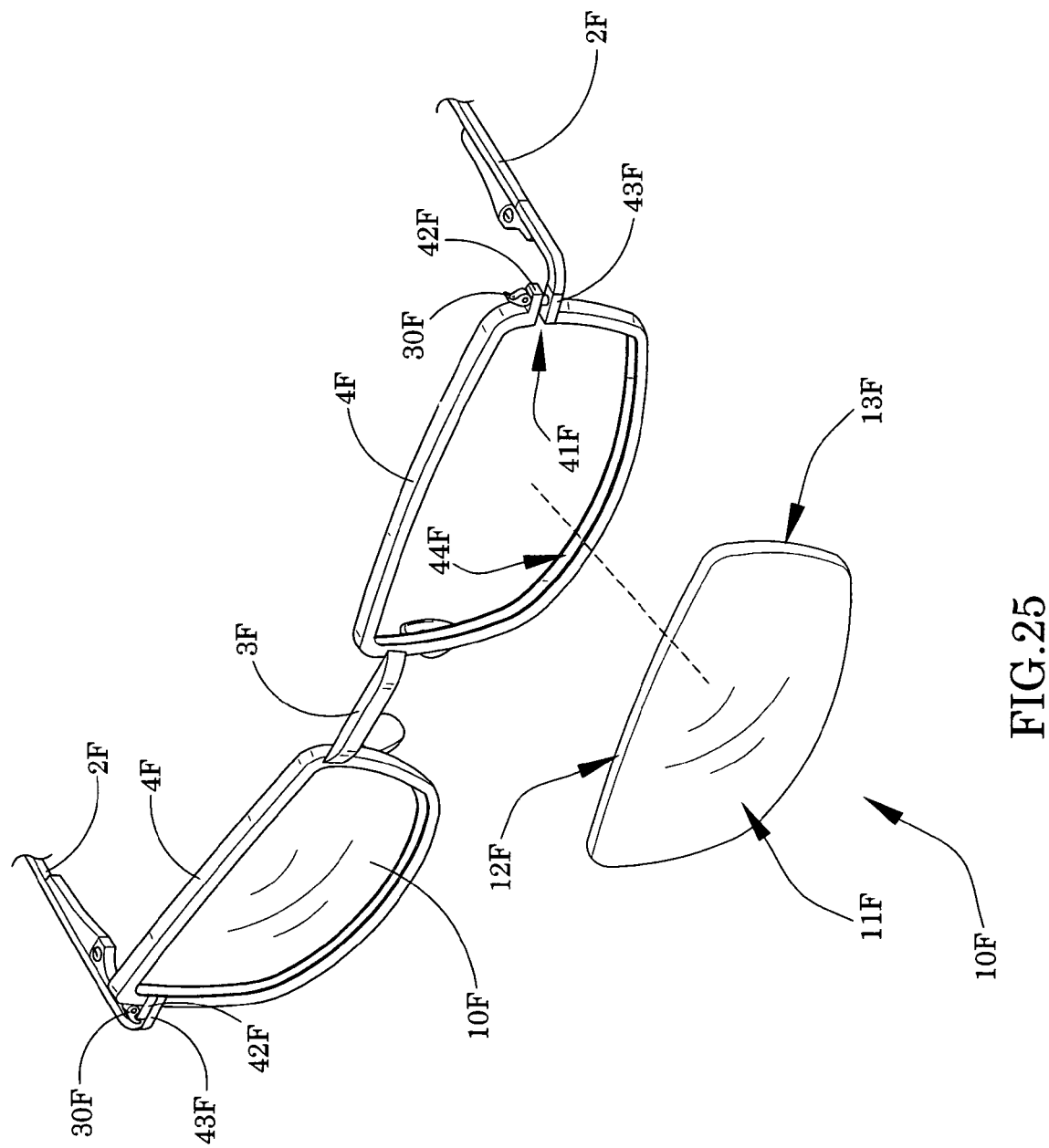
FIG. 25 is a schematic view of the structure of the spectacles according to a seventh embodiment of the present invention, illustrating the connection mechanism incorporating with the rim-type spectacles.
Figure 26:
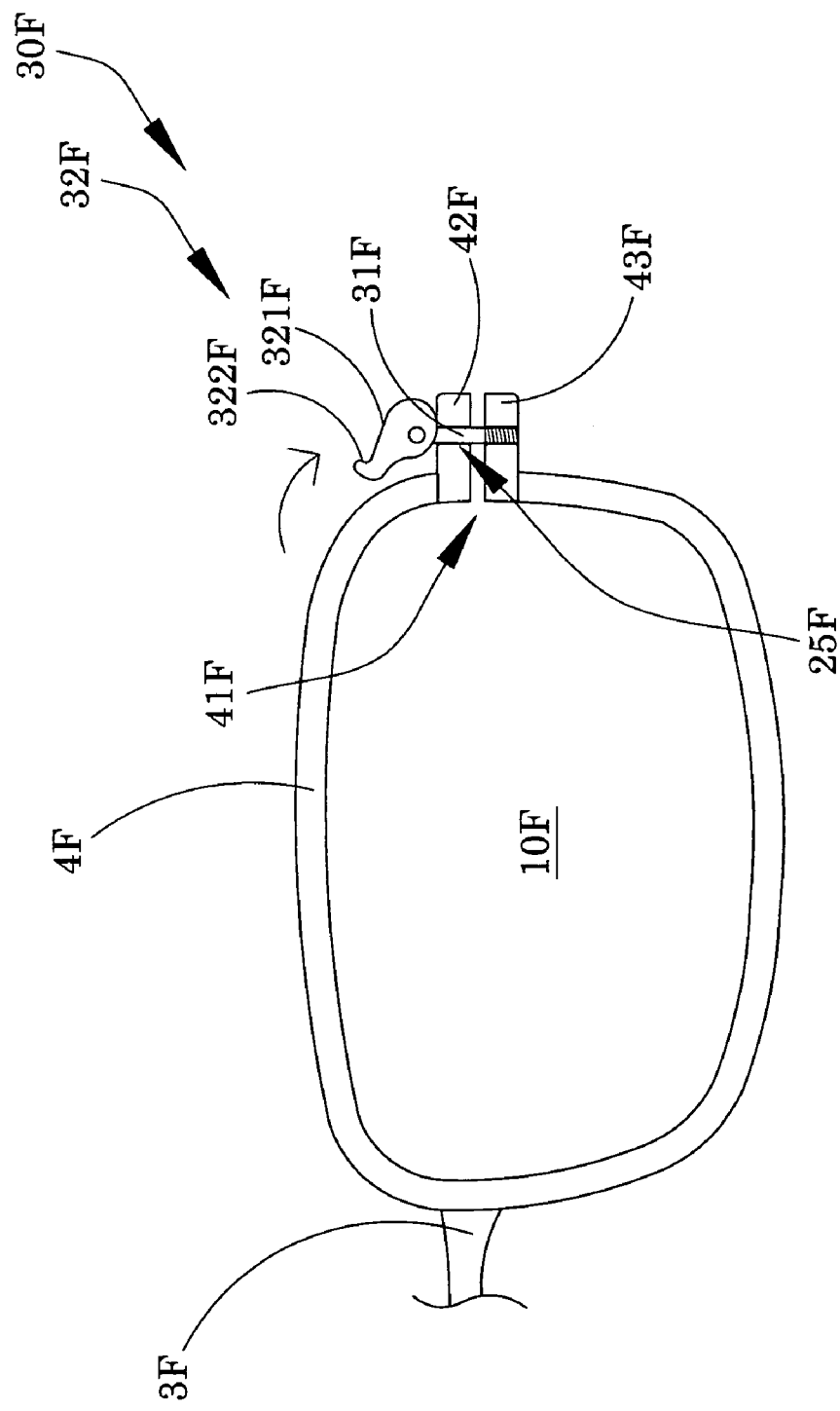
FIG. 26 is a schematic view of the spectacles according to the above seventh embodiment of the present invention, illustrating the connection mechanism incorporating with the lens rim.
Figure 27:
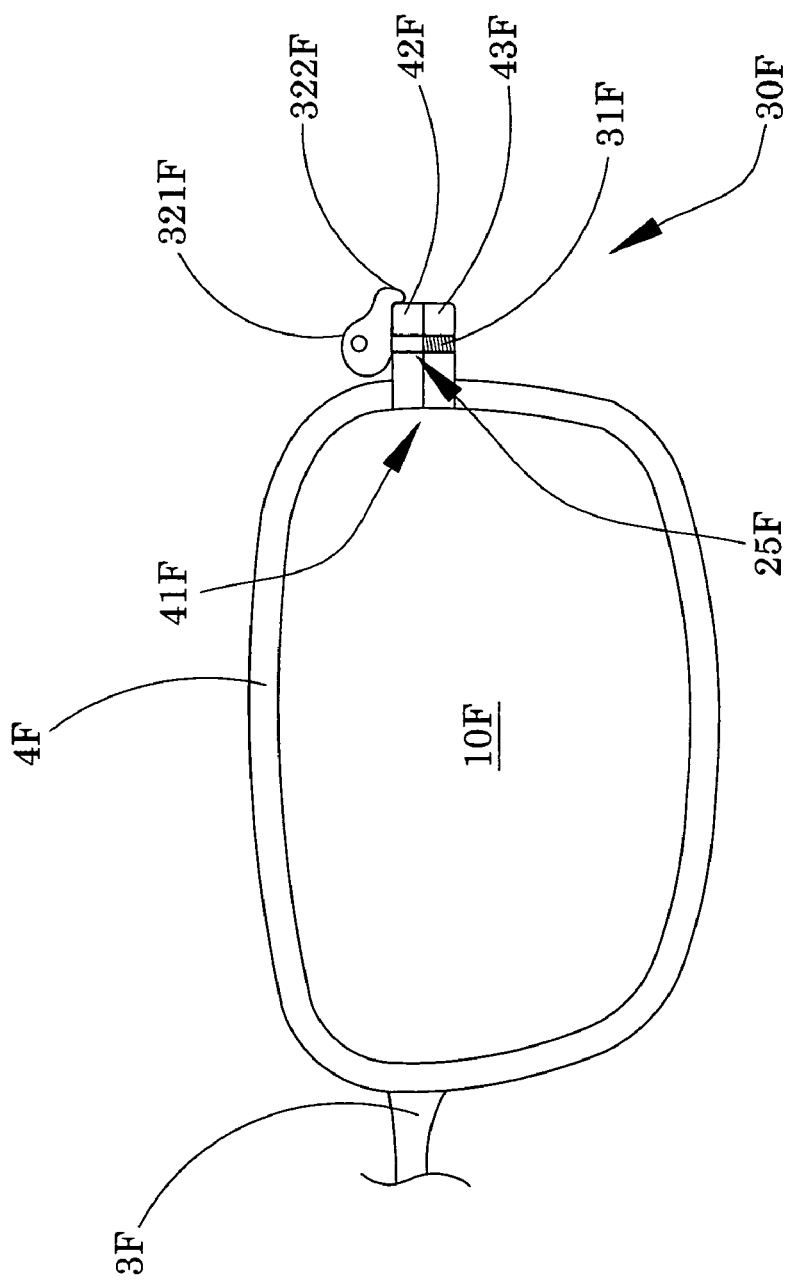
FIG. 27 is a schematic view of the spectacles according to the above seventh embodiment of the present invention, illustrating the lens being secured at the lens rim via the connection mechanism.

FIGS. 25 to 27 illustrate an alternative mode of the spectacles of the sixth embodiment, wherein the spectacles is the rim-type spectacle incorporating with the connection mechanism. As shown in FIG. 25, the spectacles comprise two lenses 10F. Each of the lenses 10F has a front side 11F, a back side 12F, and a peripheral edge 13F located between the laterals of front and the rear sides 11F, 12F.

The spectacles further comprise a frame which comprises two lens rims 4F encirclingly holding around the peripheral edges 13F of the lenses 10F respectively, two temple units 2F extended from two outer sides of the lens rims 4F respectively, and a bridge 3F extended between two inner sides of the lens rims 4F respectively.

As shown in FIGS. 25 to 27, each of the lens rims 4F has a side opening 41F provided at the outer side to form a C-shaped structure and upper and lower engaging members 42F, 43F extended from two ends of the lens rim 4F at the side opening 41F, wherein when the upper and lower engaging members 42F, 43F are biased against each other via a second connector 30F to close the side opening 41F, the respective lens 10F is retained within the lens rim 4F. Preferably, each of the temple units 2F is extended from the respective lower engaging member 43F.

Each of the lens rims 4F further has a lens groove 44F indently provided at the inner surface of the lens rim 4F to engage with the peripheral edge 13F of the lens 10F. Therefore, when the side opening 41F is closed, the respective lens 10F is securely retained within the lens rim 4F.

Each of the second connectors 30F comprises a connecting member 31F and a clipping member 32F, wherein each of the connecting members 31F is coupled with the upper and lower engaging members 42F, 43F. The connecting member 31F has one end coupling with the lower engaging member 43F and an opposed end slidably extending through the upper engaging member 42F to pivotally couple with the clipping member 32F. Accordingly, the respective end of the connecting member 31F is a threaded end securely engaging with the lower engaging member 43F, wherein the coupling slot 25F is formed through the upper engaging member 42F for the connecting member 31F slidably passing through the coupling slot 25F.

The clipping member 32F is pivotally engaged with connecting member 31F, wherein the clipping member 32F comprises a pressuring clipper 321F and a trigger 322F. The pressuring clipper 321F is pivotally coupled with the corresponding end of the connecting member 31F while the trigger 322F is extended from the pressuring clipper 321F. When the trigger 322F is actuated to pivotally move the pressuring clipper 321F to bias against the upper engaging member 42F, the upper engaging member 42F is pressed to bias against the lower engaging member 43F so as to close the side opening 41F of the respective lens rim 4F. Therefore, the lens 10F can be quickly and firmly retained within the respective lens rim 4F by the clipping force.

According to the above embodiments, the temple units 2 and the bridge 3 can be precisely and rapidly coupled with the lenses 10 via the above mentioned assembling structures. In addition, the lens 10 can be selectively cut in different styles according to the user's preference to incorporate with the temple units 2 and the bridge 3 via the above mentioned connection mechanisms. Therefore, there is no limitation of the lens, such as the shape, the size, or the thickness for incorporating with the connection mechanism.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pair of rimless spectacles, comprising:
two lenses, each of said lenses has a front side, a rear side, and a peripheral edge;
a frame which comprises two temple units and a bridge; and
a connection mechanism, which comprises:
a plurality of first connectors spacedly provided at said lenses at a predetermined location; and
a plurality of second connectors provided at a predetermined location of each of said temple units and said bridge respectively, wherein said second connectors are coupled with said first connectors respectively to couple said temple units at two outer sides of said lenses respectively and to couple said bridge between two inner sides of said lenses respectively in a tool-less manner,
wherein said first connectors are four coupling slots provided at said inner and outer sides of said lenses respectively, wherein each of said coupling slots is indently formed at said peripheral edge of said respective lens to define two spaced apart opening edges at said peripheral edge and an opening between said opening edges, wherein each of said coupling slots further has two side surfaces extended from said opening edges respectively and an arc surface extended between said side surfaces to define a curved contacting surface, wherein each of said second connectors has a corresponding size and shape to fit into said respective coupling slot, wherein a distance between said two side surfaces, which are extended parallelly, equals to a distance between said two opening edges such that a width of said opening is equal to said distance between said two side surfaces, wherein each of second connectors comprises a connecting member and a clipping member, wherein each of said connecting members comprises a retention inserter slidably inserted into said respective coupling slot inwardly from said peripheral edge of said lens and a coupling shaft pivotally coupling with said clipping member to lock up said connecting member at said coupling slot from said rear side of said lens.

2. The rimless spectacles, as recited in claim 1, wherein each of said retention inserter, having a shape and size corresponding to said coupling slot, has a retention surface and a biasing surface, wherein when said retention inserter is slidably engaged with said coupling slot, said retention surface of said retention inserter is biased against said curved contacting surface, wherein said clipping member is pivotally moved at said rear side of said lens to bias against said biasing surface of said retention inserter.

3. The rimless spectacles, as recited in claim 2, wherein each of said fastening elements comprises a pressuring clipper pivotally coupled with said coupling shaft and a trigger extended from said pressing clipper to pivotally move said pressuring clipper to bias against said biasing surface of said retention inserter at said rear side of said lens.

* * * * *